(12) United States Patent
Barve et al.

(10) Patent No.: US 10,904,169 B2
(45) Date of Patent: Jan. 26, 2021

(54) PASSING CHATBOT SESSIONS TO THE BEST SUITED AGENT

(71) Applicant: INTERNATIONAL BUSINESS MACHINES CORPORATION, Armonk, NY (US)

(72) Inventors: Ketan Barve, Jersey City, NJ (US); Tochi Eke-Okoro, Rahway, NJ (US); Joachim Frank, Tuebingen (DE); Vivek Salve, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 788 days.

(21) Appl. No.: 15/671,177

(22) Filed: Aug. 8, 2017

(65) Prior Publication Data

US 2019/0052584 A1    Feb. 14, 2019

(51) Int. Cl.
| | | |
|---|---|---|
| *G06F 40/30* | (2020.01) | |
| *H04L 12/58* | (2006.01) | |
| *G06Q 30/00* | (2012.01) | |
| *G06Q 10/04* | (2012.01) | |

(52) U.S. Cl.
CPC .............. *H04L 51/02* (2013.01); *G06F 40/30* (2020.01); *G06Q 10/04* (2013.01); *G06Q 30/016* (2013.01); *H04L 51/04* (2013.01)

(58) Field of Classification Search
CPC .. G06N 3/04; G06N 3/049; G06F 2207/4824; G06F 40/30
USPC ...................................................... 706/15, 45
See application file for complete search history.

(56) References Cited

U.S. PATENT DOCUMENTS

| | | |
|---|---|---|
| 6,173,053 B1 | 1/2001 | Bogart et al. |
| 7,814,048 B2 | 10/2010 | Zhou et al. |
| 8,238,541 B1 | 8/2012 | Kalavar |
| 8,639,638 B2 | 1/2014 | Shae et al. |
| 9,549,065 B1 | 1/2017 | Naik et al. |
| 2008/0147406 A1 | 6/2008 | Da Palma et al. |
| 2015/0103984 A1 | 4/2015 | Peterson |

(Continued)

FOREIGN PATENT DOCUMENTS

WO    0209399 A2    1/2002

OTHER PUBLICATIONS

Omnichannel Sales Solutions, "6 Reasons Retail Websites Really Need Live Chat", printed Jun. 15, 2017, pp. 1-5.

(Continued)

*Primary Examiner* — David R Vincent
(74) *Attorney, Agent, or Firm* — Richard A. Wilhelm

(57) ABSTRACT

Embodiments of the present invention disclose a method, computer program product, and system for an automated chat bot conversation session and an agent transfer system for the conversation session. The computer receives a user input from a user in an automated chat bot conversation session. The computer analyzes the user input for at least one sentiment, wherein an at least one analysis result is a value assigned to the at least one sentiment contained within the user input. The computer compares the at least one analysis result to a threshold value to determine if the user should be transferred from the automated chat bot conversation session to a conversation session with a suitable agent. The computer then transfers the user to the conversation session with the suitable agent.

18 Claims, 16 Drawing Sheets

(56) References Cited

U.S. PATENT DOCUMENTS

| | | | |
|---|---|---|---|
| 2015/0281436 A1 | 10/2015 | Kumar et al. | |
| 2015/0310446 A1* | 10/2015 | Tuchman | G06Q 30/016 705/304 |
| 2016/0110422 A1 | 4/2016 | Roytman et al. | |
| 2018/0077088 A1* | 3/2018 | Cabrera-Cordon | G06N 20/00 |
| 2018/0115643 A1* | 4/2018 | Skiba | H04L 51/02 |
| 2018/0315131 A1* | 11/2018 | Peh | G06Q 40/123 |
| 2019/0005024 A1* | 1/2019 | Somech | H04L 51/36 |

OTHER PUBLICATIONS

BOLD360, "Intelligent engagement that puts customers first.", Live Chat and Customer Engagement Software Platform, printed Jun. 15, 2017, pp. 1-5, https://www.bold360.com/.

IBM, "Conversation", Build chatbots that understand natural language and deploy them on messaging platforms and websites, on any device, IBM Watson Developer Cloud, printed Jun. 15, 2017, pp. 1-3.

IBM, "Dialog", Script conversations any way you like to answer questions, walk through processes, or just to chat! Note: The Dialog service is deprecated as of Aug. 15, 2016, IBM Watson Developer Cloud, printed on Jun. 15, 2017, 7 pages.

Wikipedia, the free encyclopedia, "Dialog system", printed on Jun. 15, 2017, pp. 1-5.

Livechat, "The fastest way to help your customers", Live Chat Software and Help Desk Software, printed on Jun. 15, 2017, pp. 1-12.

LivePerson, "LivePerson transforms customer care from voice calls to mobile messaging", The World's #1 Messaging and Bots Platform for Brands, printed on Jun. 15, 2017, p. 1.

Livezilla, "The Customer Support Software that is all yours.", Live Chat, Live Support, Ticket System and Customer Support System, printed on Jun. 15, 2017, pp. 1-2.

Russell, "Real-Time Topic and Sentiment Analysis in Human-Robot Conversation", Master's Theses (2009-), Paper 338, A Thesis submitted to the Faculty of the Graduate School, Marquette University, Dec. 2015, pp. 1-83.

Wikipedia, a free encyclopedia, "Sentiment analysis", printed on Jun. 15, 2017, pp. 1-9.

Wiki, ServiceNow®, "Setting Up Chat Queues for Help Desk Chat", Product Documentation, printed Jun. 15, 2017, pp. 1-4.

IBM, "Tone Analyzer", Understand tone and style in written text, IBM Watson Developer Cloud, printed on Jun. 15, 2017, 4 pages.

Wikipedia, the free encyclopedia, "Turing test", printed Jun. 15, 2017, pp. 1-23.

Cook, "Using Bots to Route Customer Requests Based on Sentiment and Emotion", Twilio blog, Oct. 12, 2016, pp. 1-15.

Chatbots, "Virtual Assistant", Humanlike artifical agents for self-service areas, printed on Jun. 15, 2017, pp. 1-5.

Wikipedia, the free encyclopedia, "Virtual assistant (artificial intelligence)", printed on Jun. 15, 2017, pp. 1-5.

Boatman, "Web-Based Live Chat: Good for Business?", Online Business, Inc.com, published on Mar. 7, 2011, pp. 1-4.

Mell et al., "The NIST Definition of Cloud Computing", Recommendations of the National Institute of Standards and Technology, Special Publication 800-145, Sep. 2011, 7 pages.

IBM, List of IBM Patents or Patent Applications Treated as Related, Appendix P, dated Jul. 3, 2019, 2 pages.

Pending U.S. Appl. No. 16/451,475, filed Jun. 25, 2019, entitled: "Passing Emotional Chatbot Sessions to the Best Suited Agent".

\* cited by examiner

PASSING CHATBOT SESSIONS TO THE BEST SUITED AGENT

BACKGROUND

The present invention relates generally to the field of analyzing sentiments of users of automated chat services, and more particularly to determining a suited agent to take over for the automated chat bot in an automated conversation session when certain sentiments are detected.

Companies have substituted the high cost for making skilled personnel available to chat with users with an automated chat bot that is trained to answer specific questions about a topic. The automated chat bots that are utilized by the companies lack the understanding of human emotions. This has led to user dissatisfaction when interacting with these automated chat bots.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for an automated chat bot conversation session and an agent transfer system for the conversation session. The computer receives a user input from a user in an automated chat bot conversation session. The computer analyzes the user input for at least one sentiment, wherein an at least one analysis result is a value assigned to the at least one sentiment contained within the user input. The computer compares the at least one analysis result to a threshold value to determine if the user should be transferred from the automated chat bot conversation session to a conversation session with a suitable agent. The computer then transfers the user to the conversation session with the suitable agent.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
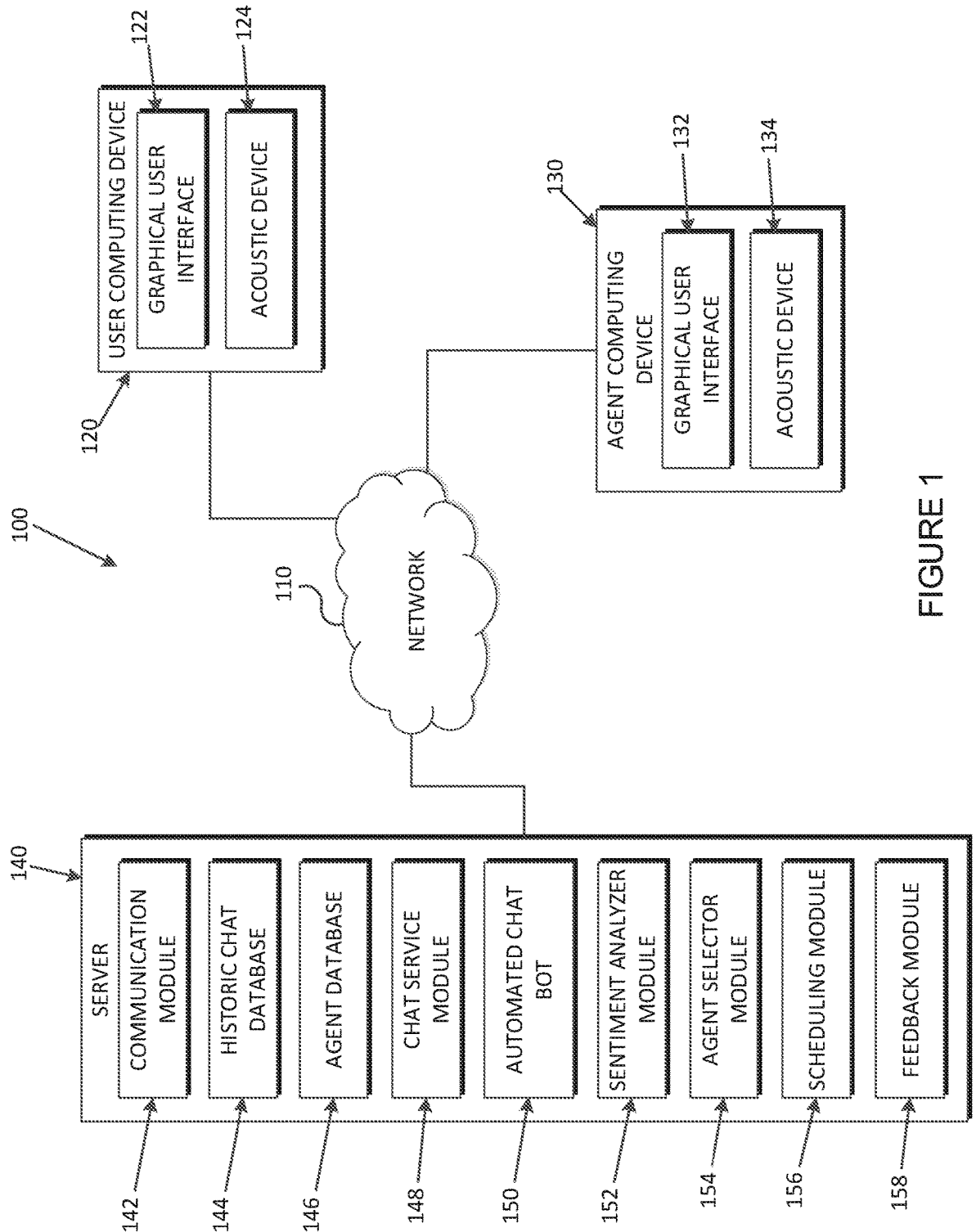
FIG. 1 is a functional block diagram illustrating a system for an automated chat bot session and an agent transfer system for the conversation session, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Embodiments of the invention are generally directed to a system for an automated chat bot session and an agent transfer system for the conversation session. The automated chat bot receives a user input from the user computing device. The sentiment analyzer analyzes the user input to determine whether the user needs to be transferred to an agent. The sentiment analyzer calculates at least one value from the user inputs. When the sentiment analyzer determines that the one or more values collected over a period of time indicate a user sentiment that warrants transferring the conversation session to an agent, the chat topic and sentiment results are transmitted to the agent selector. The transfer to an agent can be triggered by one emotional input and/or by adding up the sentiments in multiple recent user inputs. The agent selector receives past conversation session results, which include user feedback, agent feedback, chat topics, and past results from the sentiment analyzer, in order to determine a suited agent to take over the conversation session. The suited agent for the conversation session is skilled in the topic and has a history of ending conversation sessions, that have similar sentiments as the one being transferred, with a positive outcome. The agent selector returns a ranking list of suitable agents for the user to choose from. When an agent is not available to chat, the user can schedule an appointment to chat with the agent, schedule a phone call, or send the agent an email. After the conversation session is completed, feedback is solicited from the user and the agent. The results from the feedback are stored in a historic chat database for future use in the agent selection process.

FIG. 1 is a functional block diagram illustrating a system for an automated chat bot session and an agent transfer system for the conversation session 100, in accordance with an embodiment of the present invention.

The system for an automated chat bot session and an agent transfer system for the conversation session 100 includes a user computing device 120, an agent computing device 130, and a server 140. The user computing device 120, the agent computing device 130, and the server 140 are able to communicate with each other, via a network 110.

The network 110 can be, for example, a local area network (LAN), a wide area network (WAN) such as the Internet, or a combination of the two, and can include wired, wireless, or fiber optic connections. In general, the network 110 can be any combination of connections and protocols that will support communications between the user computing device 120, the agent computing device 130, and the server 140, in accordance with one or more embodiments of the invention.

The user computing device 120 may be any type of computing device that is capable of connecting to the network 110, for example, a laptop computer, tablet computer, netbook computer, personal computer (PC), a desktop computer, a smart phone, or any programmable electronic device supporting the functionality required by one or more embodiments of the invention. The user computing device 120 may include internal and external hardware components, as described in further detail below with respect to FIG. 9 or FIG. 10. In other embodiments, the user computing device 120 may operate in a cloud computing environment, as described in further detail below with respect to FIG. 11 and FIG. 12.

The user computing device 120 represents a computing device that includes a user interface, for example, a graphical user interface 122. The graphical user interface 122 can be any type of application that contains the interface to transmit a user input to the chat service module 148 and/or receive a user input from the chat service module 148. The user computing device 120 further includes an acoustic device 124 that is able to play an auditory chat message. Furthermore, the acoustic device 124 is able to receive verbal inputs from the user.

The agent computing device 130 may be any type of computing device that is capable of connecting to the network 110, for example, a laptop computer, tablet computer, netbook computer, personal computer (PC), a desktop computer, a smart phone, or any programmable electronic device supporting the functionality required by one or more embodiments of the invention. The agent computing device 130 may include internal and external hardware components, as described in further detail below with respect to FIG. 9 or FIG. 10. In other embodiments, the agent computing device 130 may operate in a cloud computing environment, as described in further detail below with respect to FIG. 11 and FIG. 12.

The agent computing device 130 represents a computing device that includes a user interface, for example, a graphical user interface 132. The graphical user interface 132 can be any type of application that contains the interface to transmit a user input to the chat service module 148 and/or receive a user input from the chat service module 148. The agent computing device 130 further includes an acoustic device 134 that is able to play an auditory chat message. Furthermore, the acoustic device 134 is able to receive verbal inputs from the agent.

The server 140 includes a communication module 142, a historic chat database 144, an agent database 146, a chat service module 148, an automated chat bot 150, a sentiment analyzer module 152, an agent selector module 154, a scheduling module 156, and a feedback module 158. The server 140 is able to communicate with the user computing device 120 and the agent computing device 130, via the network 110. The server 140 may include internal and external hardware components, as depicted and described in further detail below with reference to FIG. 10. In other embodiments, the server 140 may include internal and external hardware components, as depicted and described in further detail below with respect to FIG. 11, and operate in a cloud computing environment, as depicted in FIG. 12.

The communication module 142 is capable of receiving inputs from the user computing device 120 and/or the agent computing device 130 and transmitting a bot input from the automated chat bot 150 to the user computing device 120 and/or agent computing device 130, via the network 110.

The historic chat database 144 and the agent database 146 are both data stores that store previously obtained data. The historic chat database 144 stores previous chat transcripts from the automated chat bot conversation sessions conducted by an agent and/or the chat service module 148, user feedback, agent feedback, and the numeric results of the sentiment analyzer for each historic chat. The historic chat database 144 receives agent feedback and user feedback from the feedback module 158. The agent database 146 includes agent skill, agent identification number, agent photo, agent phone number, agent email, and any other information corresponding to an agent.

The chat service module 148 is the chat service application. The user computing device 120 transmits and receives inputs to and from the chat service module 148 to be displayed on the graphical user interface 122. The agent computing device 130 also transmits and receives inputs to and from the chat service module 148 to be displayed on the graphical user interfaces 122 and 132. The chat service module 148 transmits user inputs to the automated chat bot 150 and then receives the response to the users input from the automated chat bot 150. The automated chat bot 150 is an automatic program that conducts a conversation via auditory or textual methods. The automated chat bot 150 will be described in further detail below. The chat service module 148 transmits the user input to the sentiment analyzer module 152 for sentiment analysis and/or the sentiment analyzer module 152 captures the user inputs in to the conversation session. The sentiment analyzer module 152 will be described in further detail below. The chat service module 148 receives a list of agents from the agent selector module 154 and their availability from the scheduling module 156. The chat service module 148 determines whether a user input is part of a new conversation session or whether it is part of an existing conversation session. The chat service module 148 determines if the conversation session is complete based on a completion signal (chat window closed) from the user computing device 120 and/or agent computing device 130.

The automated chat bot 150 is a computer program which conducts a conversation via auditory or textual methods. The automated chat bot 150 is designed to simulate how a human would behave as a conversational partner. The automated chat bot 150 is used in dialog systems for customer service, information acquisition, and other such uses. The automated chat bot 150 receives an input from the chat service module 148 and scans for keywords within the user input and/or determines the topic and intent of the input using human language classifiers (for example, IBM Watson™ Natural Language Classifier). The automated chat bot 150 then pulls a reply with the most matching keywords, and/or based on the identified topic and user intent, from a database (not shown). The database is stored within the automated chat bot 150. The automated chat bot 150 then transmits the response to the chat service module 148. The automated chat bot 150 also receives user inputs from the sentiment analyzer module 152 when the sentiment analyzer module 152 determines that the user input does not trigger a transfer to an agent.

The sentiment analyzer module 152 receives user inputs from the chat service module 148. The sentiment analyzer module 152 analyzes each user input and gives a value to the user input for certain sentiments, such as anger, disgust, fear, joy, sadness, or other sentiments, and/or any combination thereof. The sentiment analyzer module 152 can analyze the user input in different ways in order to determine whether the user should be transferred to an agent. One way that the sentiment analyzer module 152 can analyze a user input is by establishing a predetermined sentiment threshold value for each sentiment, and counting the number of times those sentiment threshold values were exceeded. The sentiment analyzer module 152 increasing a counter by one for each at least one sentiments that exceeds the threshold value for the at least one sentiment. The sentiment analyzer module 152 compares the number on the counter to a cumulative threshold value, such that, the conversation session is transferred to the suitable agent when the number of the counter is greater than the cumulative threshold value.

Another way the sentiment analyzer module 152 can analyze a user input in order to determine whether a user should be transferred to an agent is by establishing, during system preparation, a plurality of band numbers for each of a plurality of sentiments, wherein each band number has a specific sentiment range. Sentiment ranges are non-overlapping and subdivide the output range of the sentiment analyzer for the chosen sentiments. The sentiment analyzer module 152 then establishes a switching score to each of the plurality of band numbers for each of the plurality of sentiments. The sentiment analyzer module 152 assigns a switching score to the user input by adding up the switching scores for each sentiment. When the sum of switching scores accumulated over a predetermined number of user inputs exceeds a threshold, the conversation session is transferred to an agent. Different sentiments have different band numbers and different switching scores associated with the band numbers, respectively.

Another way the sentiment analyzer module 152 can analyze a user input in order to determine whether a user should be transferred to an agent is by creating sentiment vectors for user inputs. During system preparation, the sentiment analyzer module 152 creates sentiment vectors from past user inputs in historic chats from the historic chat database 144 and establishes a switching score for each vector based on the associated user input. An administrator who assesses the mood of those historic inputs ("if the user says this, how urgent is it to transfer the session") and accordingly assigns a switching score via the sentiment analyzer module 152. During execution, the sentiment analyzer module 152 determines the switching score of a current user input by averaging the switching scores of the nearest neighbor vectors of historic user inputs in sentiment space. In sentiment space, see, for example, FIG. 8, the nearest neighbors to the current conversation session sentiment vector, which represent historic user inputs with similar sentiments, are found from the historic chat database 144. The switching scores of the nearest neighbor sentiment vectors are averaged to get the switching score of the current user input. The sentiment analyzer module 152 adds switching scores of a predetermined number of past user inputs together when there is more than one user input. When the sum exceeds a predetermined transfer threshold value, the results of the sentiment analysis are transferred to the agent selector module 154. When the sum does not exceed the predetermined transfer threshold value, the user input is sent to the automated chat bot 150 and the automated chat bot session continues. When one user input does not exceed the predetermined transfer threshold value, the sentiment analyzer module 152 is able to analyzes a predetermined number of past user inputs to determine if the total sum exceeds the predetermined threshold value.

The agent selector module 154 receives the sentiment analysis results from the sentiment analyzer module 152. The agent selector module 154 receives the chat topic from the chat service module 148. The agent selector module 154 retrieves the historical conversation sessions from the historic chat database 144 that are closest in topic and sentiment to the current conversation session. The agent selector module 154 also receives agent specific information about the agents of the corresponding historic chats from the agent database 146. The closest historic chats are grouped based on the agents who conducted those historical conversation sessions. The chat outcome rating is determined by the feedback module 158 and is added up for each group to determine an overall chat outcome rating for each agent. The chat outcome rating is a score assigned to the historic chats based on feedback gathered from the user and the agent at the conclusion of the conversation session. The chat outcome rating is discussed in further detail below. The group's overall chat outcome rating is multiplied by a weighting factor. The weighting factor is calculated by Equation 1:

$$W=(1+f \log C)/C \qquad (1)$$

W is the weighting factor, f is a constant between 0 and 1, which determines the influence of agent experience in their selection, and C is the number of conversation sessions in the group. When f is 0, the weighting factor is 1/C and the result is the average of the chat outcome ratings in each group. When f is 1, the average chat outcome in each group is multiplied by a factor that grows with the logarithm of the number of conversation sessions in the group. By adjusting f, the influence of agent experience on their selection can be fine-tuned. In a situation where all agents are new, a setting of f=0 may be most appropriate. In a situation where some agents are very experienced (have conducted a high number of conversation sessions) a larger value of f can favor the selection of more experienced agents, even if their chat outcomes do not exceed those of less experienced agents. The agents that receive the highest values when multiplying the overall chat outcome rating by the weighting factor are the agents suited to take over the conversation session. The agent selector module 154 transmits a list of the suited agents to the scheduling module 156 to check for availability. When there are no similar historic chats, a random agent is assigned to the user by the agent selector module 154.

The scheduling module 156 receives a list of agents from the agent selector module 154. The scheduling module 156 determines whether the agents are available to chat. When the agents suited to take over the conversation session are unavailable, the scheduling module 156 retrieves the agents' schedules and finds their times of availability. The scheduling module 156 transmits whether an agent is available and/or times when the agent is available to the chat service module 148. The scheduling module 156 retrieves the agents' email addresses from the agent database 146 and transmits their email addresses to the chat service module 148 as well. The chat service module 148 then offers alternative communication channels to the user, for example, an email address to contact the agent in writing and/or the availability of the suited agents for scheduling a conversation session or call at a future point in time.

The feedback module 158 transmits a feedback request to the user computing device 120 and to the agent computing device 130 once that conversation session has been completed. The feedback request includes questions regarding the outcome of the conversation session, whether the issue was resolved, and other such questions. Based on the responses to the feedback questions, first chat outcome rating from the user is calculated. In addition, the agents rate the conversation session, evaluating criteria such as business impact, revenue opportunity, and other such criteria. The agent's chat rating of the conversation session is the second chat outcome rating. The chat outcome rating assigned by the user and the agent are normalized and then averaged together. A weighted average of the chat outcome rating of the agent and the user could be taken to show the significance of one over the other when the outcome of the conversation session is extreme, such as when a user is dissatisfied, satisfied, and/or when the opinion of the chat outcome of the agent and the user are different. For example, the feedback request could ask the agent and user a series of questions where an answer of 0 is highly dissatisfied and an answer of 10 is highly satisfied. The feedback module 158 transmits the overall outcome rating to the historic chat database 144 to store with the chat transcript.

Figure 2A:
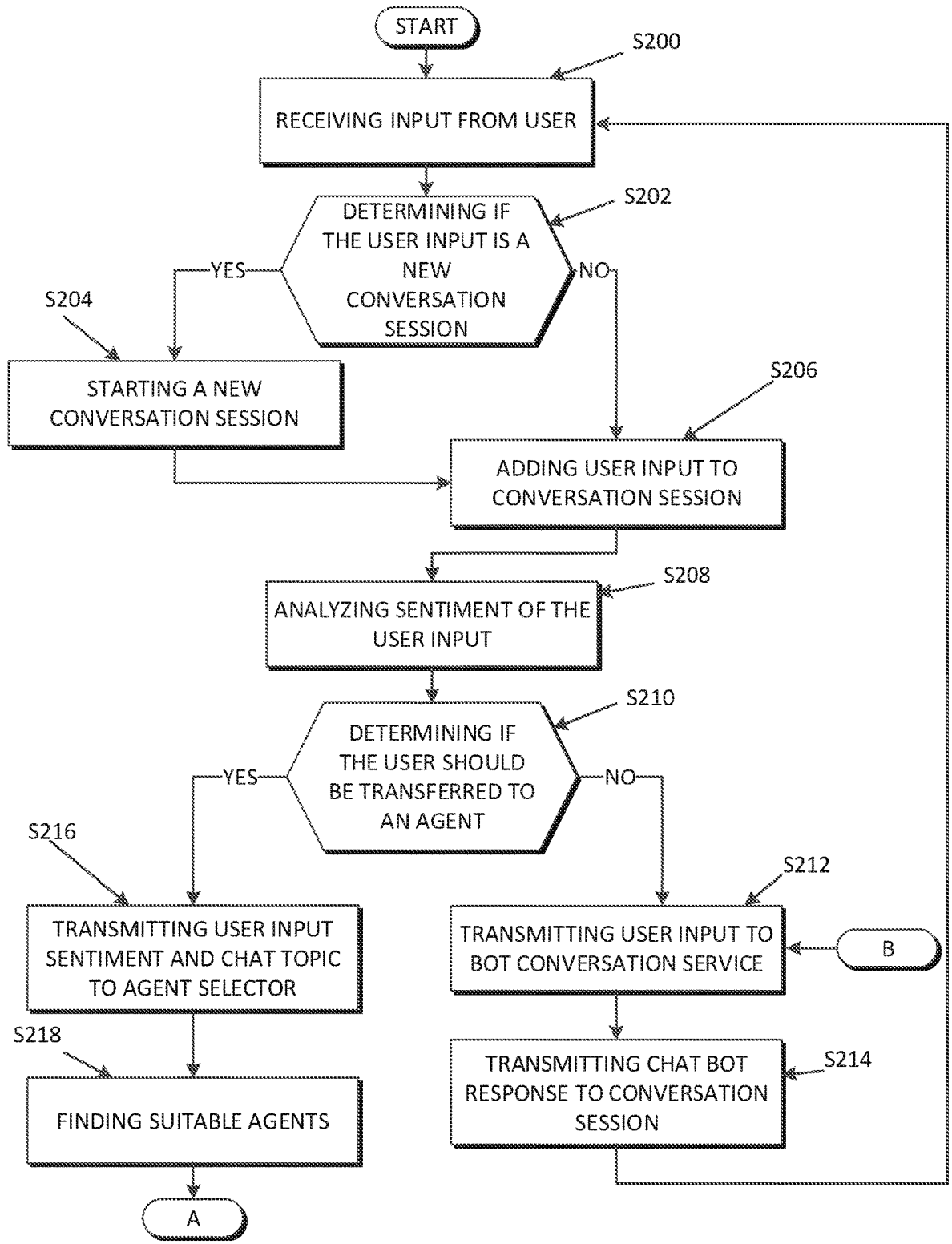
FIGS. 2A and 2B are flowcharts depicting operational steps to determine a transfer of a chat bot session to an agent and to select the suited agent based on user sentiments in an automated conversation session within the environment of FIG. 1, in accordance with an embodiment of the present invention.
Figure 2B:
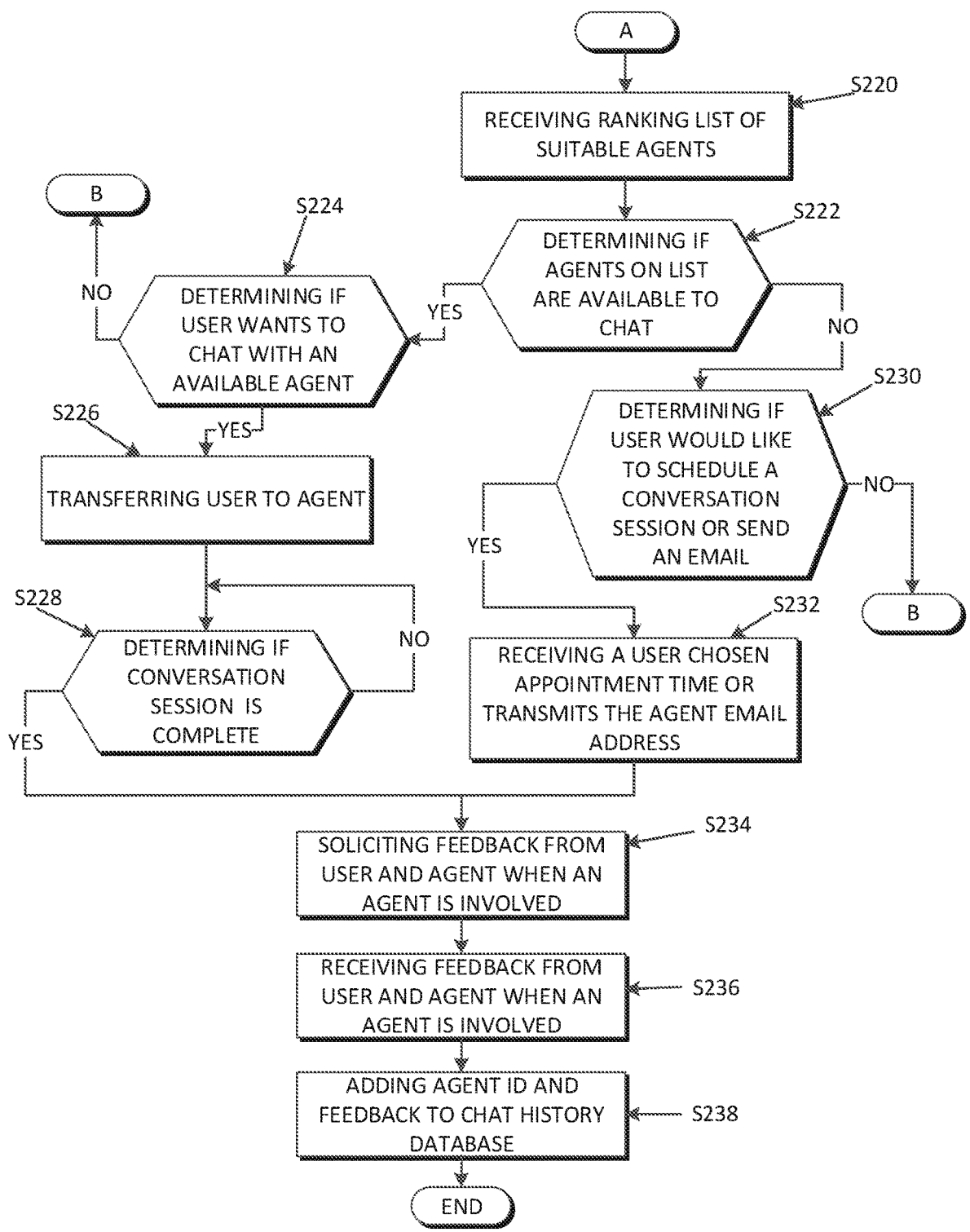

FIGS. 2A and 2B represent the sentiment analyzer module 152 analyzing a user input from the user computing device 120 to determine whether the user should be transferred to an agent and the agent selector module 154 determining agents to take over the conversation session.

FIG. 2A illustrates the sentiment analyzer module 152 analyzing a user input from the user computing device 120 and FIG. 2B illustrates the agent selector module 154 determining agents to take over the conversation session. The chat service module 148 receives an input from the user computing device 120, via the graphical user interface 122 and/or the acoustic device 124 (S200). The chat service module 148 determines if the user input is a new conversation (S202). When the user input is a new conversation, the chat service module 148 starts a new conversation session (S204) and the chat service module 148 adds the user input to the conversation session (S206). When the user input is not a new conversation, the chat service module 148 adds the user input to the conversation session (S206). The sentiment analyzer module 152 analyzes the sentiment of the user input (S208). The sentiment analyzer module 152 determines whether the user should be transferred to an agent based on the analysis of the user input (S210). The sentiment analyzer module 152 determines that the user should not be transferred to an agent, then the sentiment analyzer module 152 transmits the user input to the automated chat bot 150 (S212). The automated chat bot 150 transmits the chat bot response to the conversation session in the chat service module 148 (S214). The chat service module 148 then receives another input from the user (S200).

The sentiment analyzer module 152 determines that the user should be transferred to an agent, then the sentiment analyzer module 152 transmits the user input to the agent selector module 154 and the chat service module 148 transmits the chat topic to the agent selector module 154 (S216). The agent selector module 154 finds suitable agents for the current conversation session by finding agents who have successful chat outcomes for similar conversation sessions (S218).

The scheduling module 156 receives a ranking list of suitable agents (S220). The scheduling module 156 determines if the agents on the list are available to chat (S222). When there are agents on the list that are available to chat, the chat service module 148 determines if the user want to chat with an available agent (S224). When the user does not want to chat with an available agent, the chat service module 148 transmits the user input to the automated chat bot 150 (S212). When the user does want to chat with an available agent, the chat service module 148 transfers the user to the agent on the agent computing device 130 (S226). The chat service module 148 determines if the conversation session is complete (S228). When the conversation session is not complete, the chat service module 148 continuously determines whether the conversation session is complete (S228).

When the agents on the list are not available to chat, the chat service module 148 determines if the user would like to schedule a conversation session, schedule a call, or send an email (S230). When the user does not want to schedule a conversation session, schedule a call, or send an email to an agent, the chat service module 148 transmits the user input to the automated chat bot 150 (S212). When the user does want to schedule a conversation session, or send an email to an agent, the chat service module 148 receives a chosen appointment time from the user or the scheduling module 156 transmits the email address of the agent to the user to allow the user to schedule a conversation session with the agent or to conduct the conversation through an email correspondence (S232). When the conversation session is complete, the feedback module 158 solicits feedback from the user and the agent (S234). The feedback module 158 receives feedback from the agent and/or the user (S236). Agent feedback is only solicited if an agent participated in the conversation session. The feedback module 158 adds the agent identification number and the received feedback to the historic chat database 144 (S238).

Figure 3A:
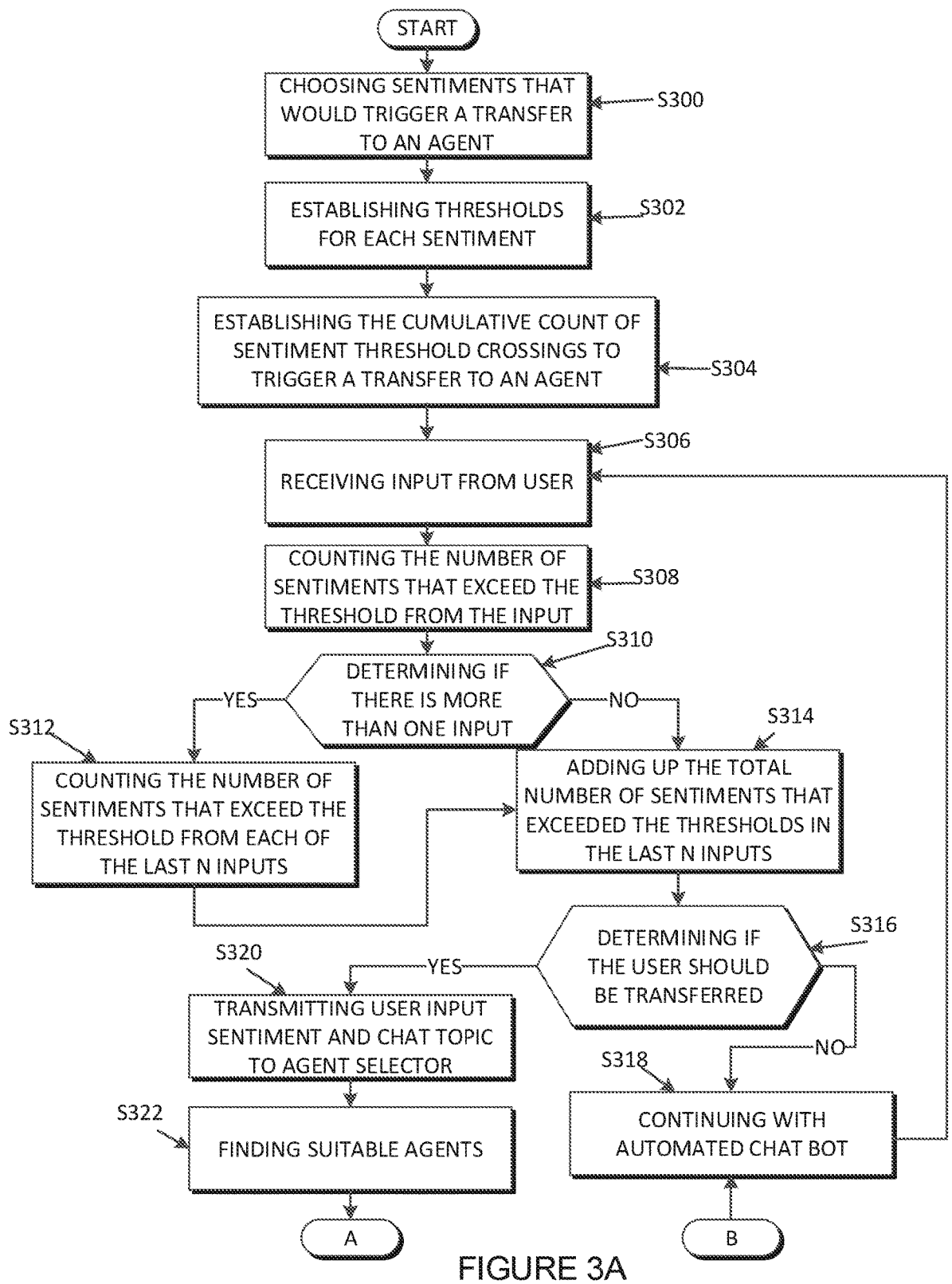
FIGS. 3A and 3B are flowcharts depicting operation steps for determining whether a user should be transferred to an agent within the environment of FIG. 1, in accordance with an embodiment of the present invention.
Figure 3B:
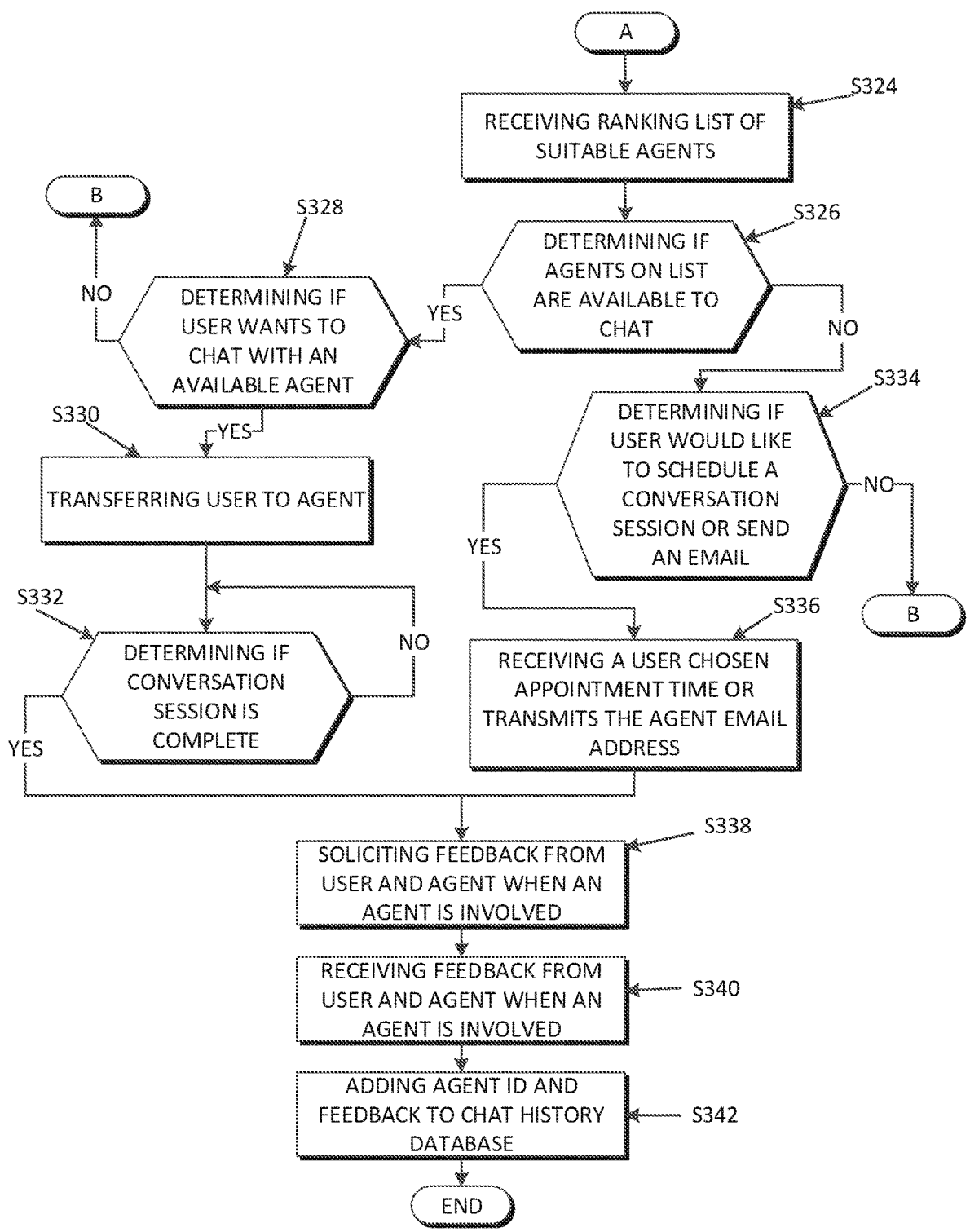

FIGS. 3A and 3B represent the sentiment analyzer module 152 determining whether the user should be transferred to an agent.

FIG. 3A illustrates the sentiment analyzer module 152 determining whether the user should be transferred to an agent and FIG. 3B illustrates the agent selector module 154 determining agents to take over the conversation session. During system preparation, the sentiment analyzer module 152 chooses sentiments that would trigger a transfer to an agent, such as anger, disgust, fear, joy, sadness, or other sentiments, and/or any combination thereof (S300). The sentiment analyzer module 152 establishes a predetermined sentiment threshold value for each sentiment (S302). The sentiment analyzer module 152 establishes a cumulative count of sentiment threshold crossings by increasing a counter by one for each sentiment that exceeds the threshold value for the at least one sentiment, to trigger a transfer to an agent based on the number of sentiment values exceeding the corresponding predetermined sentiment threshold values (S304). Steps 300-304 are established during the initial set up of the sentiment analyzer module 152, and/or steps 300-304 can be established during activate conversation sessions to utilize up to date data. The sentiment analyzer module 152 receives a user input from the chat service module 148 (S306). The sentiment analyzer module 152 counts the number of sentiments that exceed each of the predetermined sentiment thresholds from the input (S308). The sentiment analyzer module 152 determines if there is more than one input (S310). When there is more than one input, the sentiment analyzer module 152 counts the number sentiments that exceed each of the predetermined sentiment thresholds from each of the last N inputs, where N represents the number of inputs to be used for user sentiment analysis, or from all user inputs when there are fewer than N inputs (S312). When there is not more than one input or when there are multiple inputs, the sentiment analyzer module 152 adds up the total number of sentiments that exceeded each of the predetermined sentiment thresholds in the last N inputs or in all of the user inputs when there are fewer than N inputs (S314). The sentiment analyzer module 152 determines if the user should be transferred to an agent based on whether or not the sum of the number of sentiments that have a sentiment value that exceeds their predetermined sentiment threshold. When the sum of the number of sentiments exceeds the cumulative threshold value, then the sentiment analyzer module 152 determines that the user should be transferred to an agent (S316). The sentiment analyzer module 152 determines that the user should not be transferred to an agent, then the sentiment analyzer module 152 transmits the user input to the automated chat bot 150 so the user can continue the conversation session with the automated chat bot (S318). The sentiment analyzer module 152 determines that the user should be transferred to an agent, then the sentiment analyzer module 152 transmits the user input to the agent selector module 154 and the chat service module 148 transmits the chat topic to the agent selector module 154 (S320). The agent selector module 154 finds suitable agents for the current conversation session by finding agents who have successful chat outcomes for similar conversation sessions (S322).

The scheduling module 156 receives a ranking list of suitable agents (S324). The scheduling module 156 determines if the agents on the list are available to chat (S326). When there are agents on the list that are available to chat, the chat service module 148 determines if the user want to chat with an available agent (S328). When the user does not want to chat with an available agent, the chat service module 148 transmits the user input to the automated chat bot 150 so the user can continue to chat with the automated chat bot (S318). When the user does want to chat with an available agent, the chat service module 148 transfers the user to the agent on the agent computing device 130 (S330). The chat service module 148 determines if the conversation session is complete (S332). When the conversation session is not complete, the chat service module 148 continuously determines whether the conversation session is complete (S332).

When the agents on the list are not available to chat, the chat service module 148 determines if the user would like to schedule a conversation session, schedule a call, or send an email (S334). When the user does not want to schedule a conversation session, schedule a call, or send an email to an agent, the chat service module 148 transmits the user input to the automated chat bot 150 so the user can continue to chat with the automated chat bot (S318). When the user does want to schedule a conversation session, schedule a call, or send an email to an agent, the chat service module 148 receives a chosen appointment time from the user or the scheduling module 156 transmits the email address of the agent to the user to allow the user to schedule a conversation session or call with the agent or to conduct the conversation through an email correspondence (S336). When the conversation session is complete, the feedback module 158 solicits feedback from the user and the agent (S338). Agent feedback is only solicited if an agent participated in the conversation session. The feedback module 158 receives feedback from the agent and/or the user (S340). The feedback module 158 adds the agent identification number and the received feedback to the historic chat database 144 (S342).

Figure 4A:
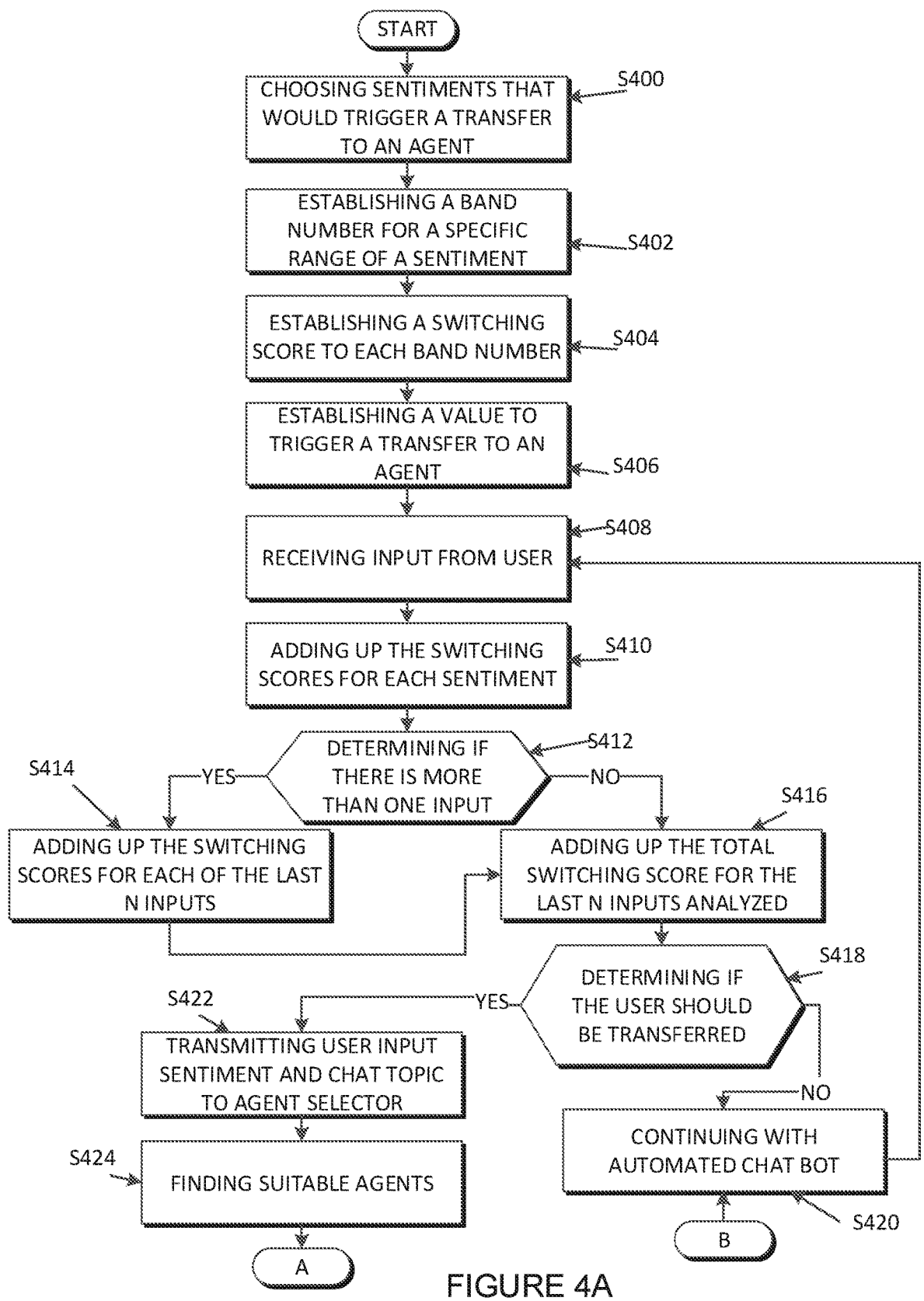
FIGS. 4A and 4B are flowcharts depicting operational steps for another way to determine whether a user should be transferred to an agent within the environment of FIG. 1, in accordance with an embodiment of the present invention.
Figure 4B:
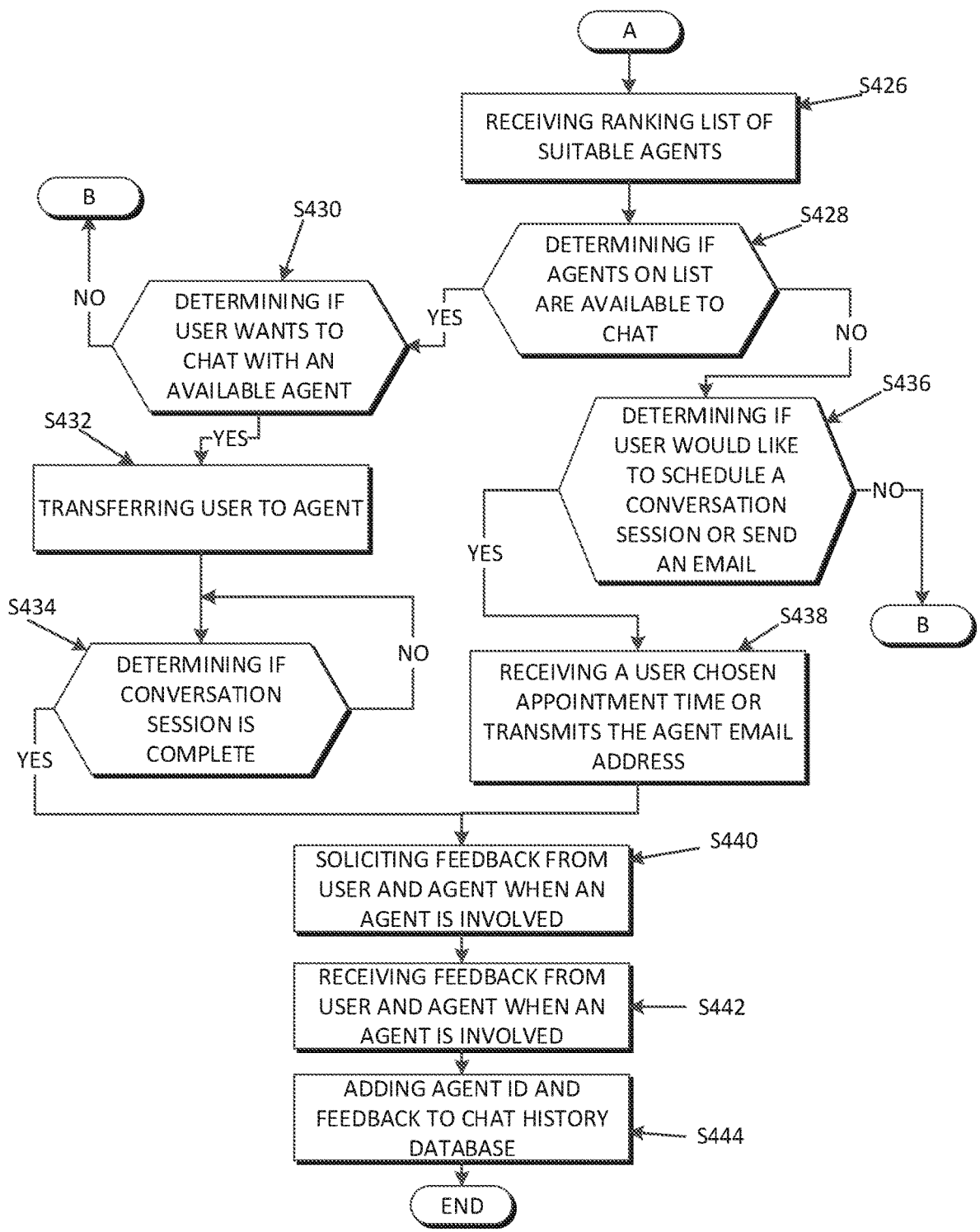

FIGS. 4A and 4B represent the sentiment analyzer module 152 determining whether the user should be transferred to an agent.

FIG. 4A illustrates the sentiment analyzer module 152 determining whether the user should be transferred to an agent and FIG. 4B illustrates the agent selector module 154 determining agents to take over the conversation session. The sentiment analyzer module 152 chooses sentiments that would trigger a transfer to an agent, such as anger, disgust, fear, joy, sadness, or other sentiments, and/or any combination thereof (S400). The sentiment analyzer module 152 establishes a plurality of band numbers for each of a plurality of sentiments, wherein each band number has a specific sentiment range (S402). The sentiment ranges are non-overlapping and cover the possible range of output values of the sentiment analyzer for the chosen sentiments. The sentiment analyzer module 152 establishes a switching score to each of the plurality of band numbers for each of the plurality of sentiments (S404). The sentiment analyzer module 152 establishes a threshold to trigger a transfer to an agent (S406). Steps 400-406 are established during the initial set up of the sentiment analyzer module 152, and/or steps 400-406 can be established during activate conversation sessions to utilize up to date data. The sentiment analyzer module 152 receives a user input from the chat service module 148 (S408). The sentiment analyzer module 152 adds up the switching scores for each sentiment (S410). The sentiment analyzer module 152 determines if there is more than one input (S412). When there is more than one input, the sentiment analyzer module 152 adds up the switching scores for each of the last N inputs, where N represents the number of inputs to be used for sentiment analysis, or all user inputs if fewer than N inputs have been received (S414). When there is not more than one input or when multiple inputs are analyzed, the sentiment analyzer module 152 adds up the total switching scores for the last N inputs analyzed (S416). The sentiment analyzer module 152 determines if the user should be transferred to an agent based on whether or not the total switching score exceeded the value to trigger a transfer (S418). The sentiment analyzer module 152 determines that the user should not be transferred to an agent, then the sentiment analyzer module 152 transmits the user input to the automated chat bot 150 so the user can continue the conversation session with the automated chat bot (S420). The sentiment analyzer module 152 determines that the user should be transferred to an agent, then the sentiment analyzer module 152 transmits the user input to the agent selector module 154 and the chat service module 148 transmits the chat topic to the agent selector module 154 (S422). The agent selector module 154 finds suitable agents for the current conversation session by finding agents who have successful chat outcomes for similar conversation sessions (S424).

The scheduling module 156 receives a ranking list of suitable agents (S426). The scheduling module 156 determines if the agents on the list are available to chat (S428). When there are agents on the list that are available to chat, the chat service module 148 determines if the user want to chat with an available agent (S430). When the user does not want to chat with an available agent, the chat service module 148 transmits the user input to the automated chat bot 150 so the user can continue to chat with the automated chat bot (S420). When the user does want to chat with an available agent, the chat service module 148 transfers the user to the agent on the agent computing device 130 (S432). The chat service module 148 determines if the conversation session is complete (S434). When the conversation session is not complete, the chat service module 148 continuously determines whether the conversation session is complete (S434).

When the agents on the list are not available to chat, the chat service module 148 determines if the user would like to schedule a conversation session, schedule a call, or send an email (S436). When the user does not want to schedule a conversation session, schedule a call, or send an email to an agent, the chat service module 148 transmits the user input to the automated chat bot 150 so the user can continue to chat with the automated chat bot (S420). When the user does want to schedule a conversation session, schedule a call, or send an email to an agent, the chat service module 148 receives a chosen appointment time from the user or the scheduling module 156 transmits the email address of the agent to the user to allow the user to schedule a conversation session with the agent or to conduct the conversation through an email correspondence (S438). When the conversation session is complete, the feedback module 158 solicits feedback from the user and the agent (S440). Agent feedback is only solicited if an agent participated in the conversation session. The feedback module 158 receives feedback from the agent and/or the user (S442). The feedback module 158 adds the agent identification number and the received feedback to the historic chat database 144 (S444).

Figure 5:
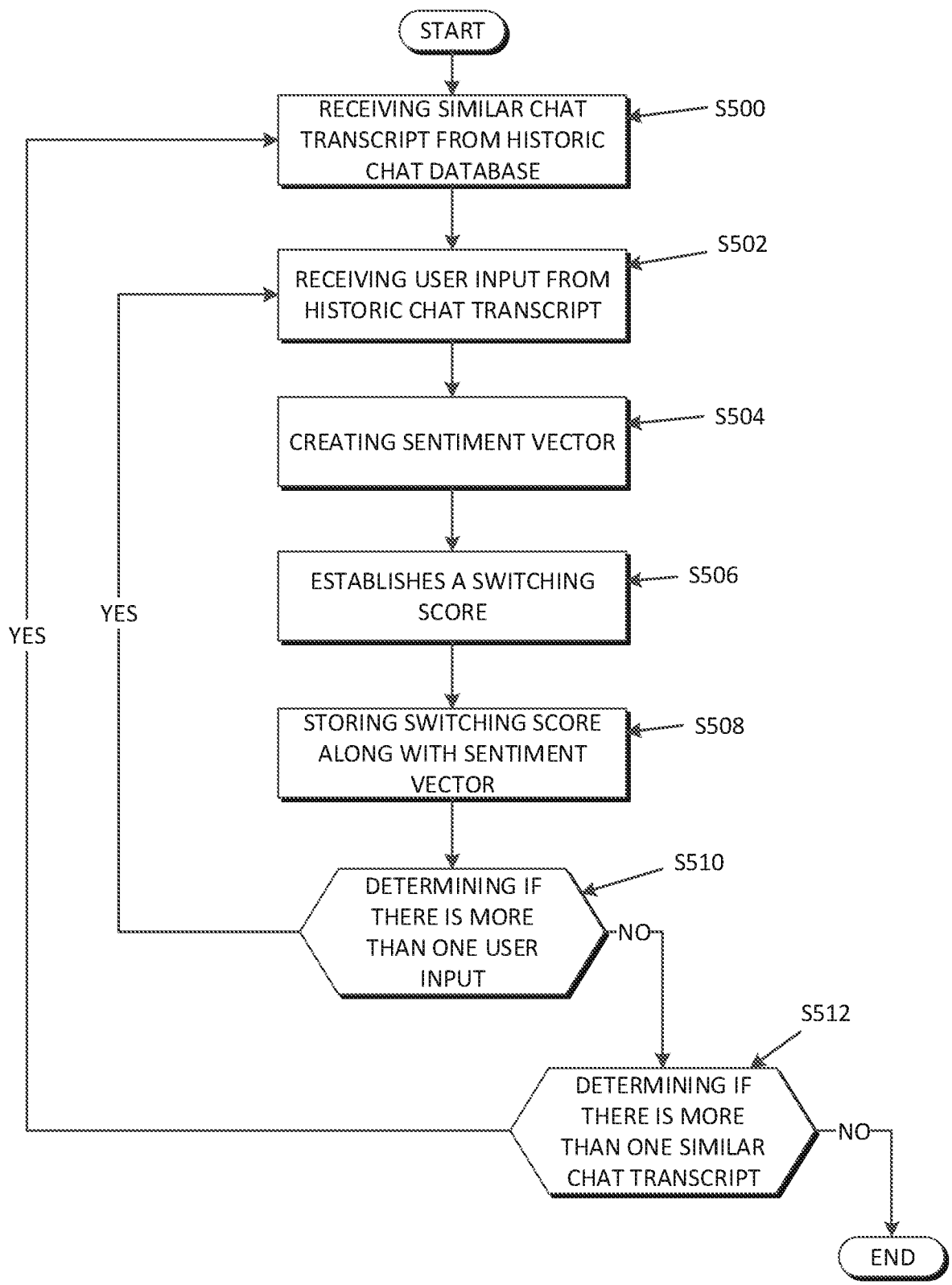
FIG. 5 is a flowchart depicting operational steps for establishing a baseline to determine whether the user should be transferred to an agent within the environment of FIG. 1, in accordance with an embodiment of the present invention.

FIG. 5 represents a baseline being established by the sentiment analyzer module 152 to determine whether the user should be transferred to an agent.

FIG. 5 illustrates the sentiment analyzer module 152 establishing a baseline to determine whether the user should be transferred to an agent by constructing sentiment vector space. The sentiment analyzer module 152 receives chat transcripts similar in topic from the historic chat database 144 (S500). The sentiment analyzer module 152 receives a user input from the retrieved historic transcripts (S502). The sentiment analyzer module 152 creates a sentiment vector from the sentiment analysis of the user input (S504). The sentiment analyzer module 152 presents the input to an administrator who assigns a switching score based on assessing how many similar user inputs should cause a session transfer to an agent (S506). Only after the space is populated with sentiment vectors that have a switching score assigned can the score of new vectors be calculated by averaging that of its nearest neighbors. The sentiment analyzer module 152 at the time of executing a conversation session determines the switching scores of ongoing conversation sessions. The sentiment analyzer module 152 stores the switching score along with the sentiment vector in the historic chat database 144 (S508). The chat service module 148 determines if there is another user input in the transcript (S510). When there is another user input, the sentiment analyzer module 152 receives the next user input from the retrieved historic transcripts (S502). When the historic transcripts do not contain any more user inputs, the sentiment analyzer module 152 determines if there is more than one similar chat transcript in the historic chat database 144 (S512). When there is more than one similar chat transcript, the sentiment analyzer module 152 receives similar chat transcripts from the historic chat database 144 (S500).

Figure 6A:
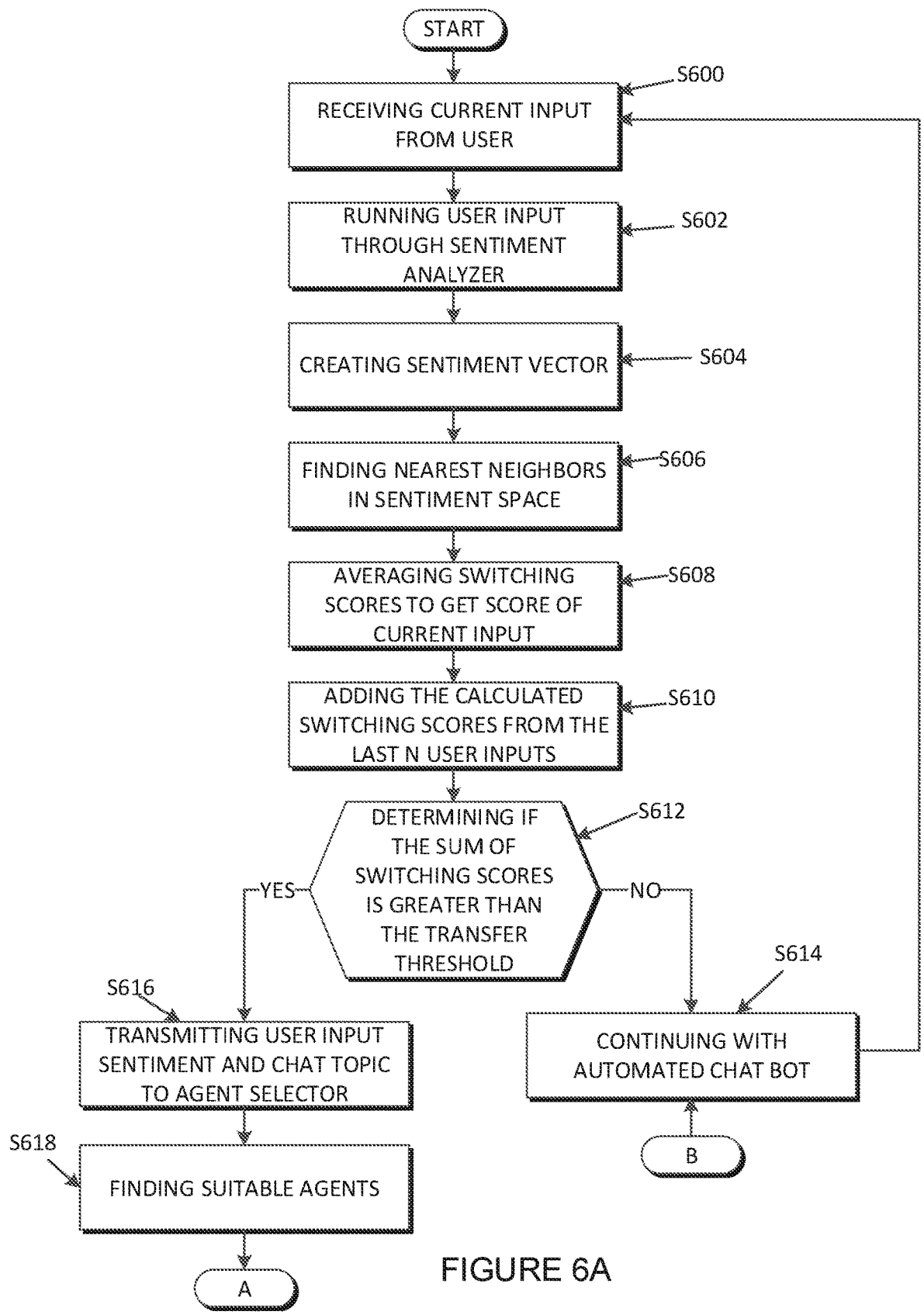
FIGS. 6A and 6B are flowcharts depicting operational steps for the execution of the way to determine whether a user should be transferred to an agent prepared in FIG. 5 within the environment of FIG. 1, in accordance with an embodiment of the present invention.
Figure 6B:
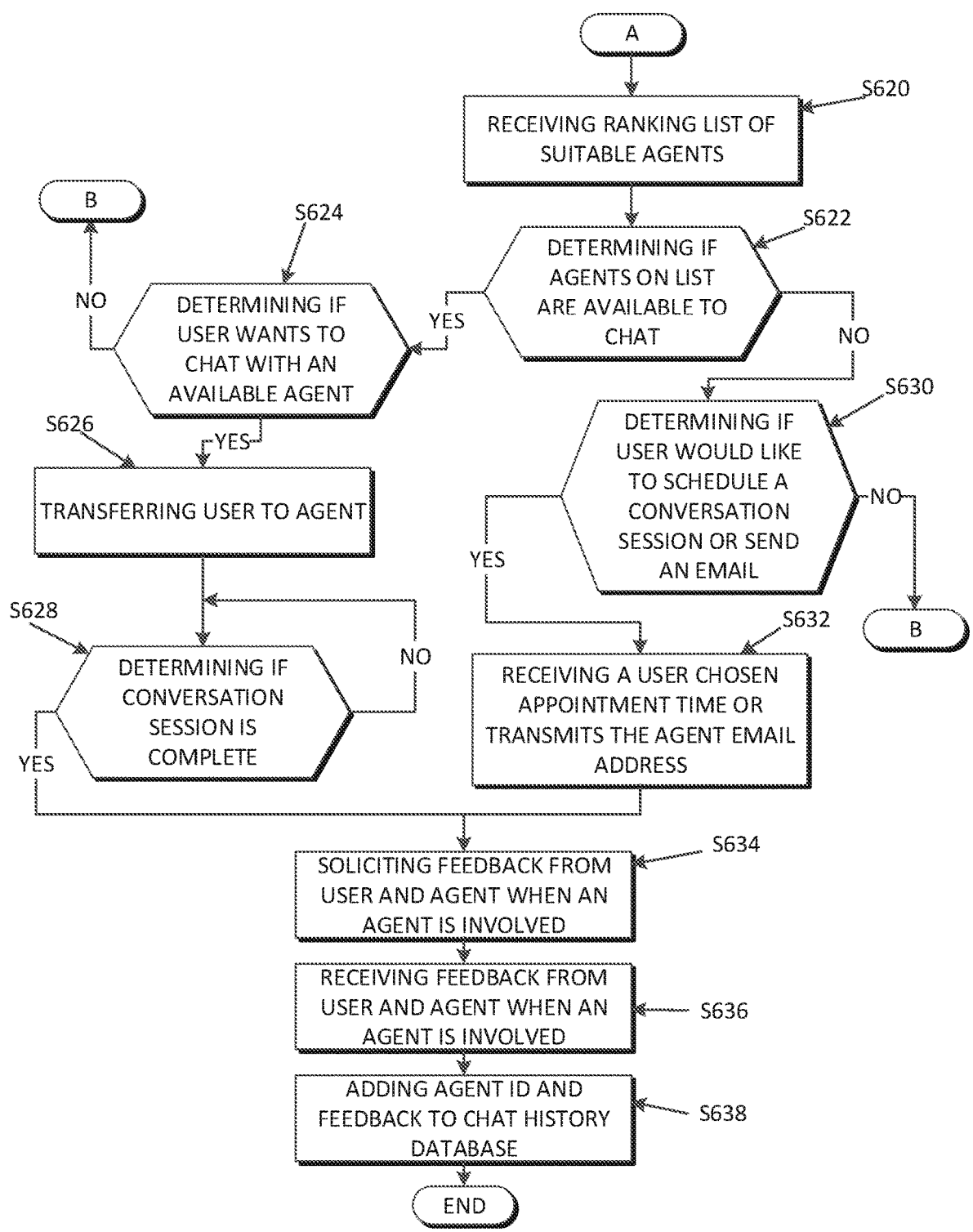

FIGS. 6A and 6B represent the execution of the sentiment analyzer module 152 determining whether the user should be transferred to an agent, using the baseline established through the method FIG. 5.

FIG. 6A illustrates the sentiment analyzer module 152 executing the determination of whether the user should be transferred to an agent by using sentiment vector space and FIG. 6B illustrates the agent selector module 154 determining agents to take over the conversation session. The sentiment analyzer module 152 receives the current user input from the chat service module 148 (S600). The sentiment analyzer module 152 runs the user input through the sentiment analyzer (S602). The sentiment analyzer module 152 creates a sentiment vector for the user input (S604). The sentiment analyzer module 152 finds the nearest neighbors in sentiment vector space (S606). The sentiment analyzer module 152 averages the switching scores of the nearest neighbor sentiment vectors to get the score of the current input (S608). The sentiment analyzer module 152 adds the averaged switching scores from the last N user inputs, where N represents a predetermined number of user inputs that are analyzed (S610). For example, the last 5 user inputs may be analyzed, or all available inputs if the user has not provided 5 or more inputs. The sentiment analyzer module 152 determines if the sum of the switching scores is greater than the transfer threshold (S612). When the sum of the switching score is not greater than the transfer threshold, the sentiment analyzer module 152 transmits the user input to the automated chat bot 150 so the user can continue the conversation session with the automated chat bot (S614). When the sum of the switching scores is greater than the transfer threshold, the sentiment analyzer module 152 transmits the user input to the agent selector module 154 and the chat service module 148 transmits the chat topic to the agent selector module 154 (S616). The agent selector module 154 finds suitable agents for the current conversation session by finding agents who have successful chat outcomes for similar conversation sessions (S618).

The scheduling module 156 receives a ranking list of suitable agents (S620). The scheduling module 156 determines if the agents on the list are available to chat (S622). When there are agents on the list that are available to chat, the chat service module 148 determines if the user want to chat with an available agent (S624). When the user does not want to chat with an available agent, the chat service module 148 transmits the user input to the automated chat bot 150 so the user can continue to chat with the automated chat bot (S614). When the user does want to chat with an available agent, the chat service module 148 transfers the user to the agent on the agent computing device 130 (S626). The chat service module 148 determines if the conversation session is complete (S628). When the conversation session is not complete, the chat service module 148 continuously determines whether the conversation session is complete (S628).

When the agents on the list are not available to chat, the chat service module 148 determines if the user would like to schedule a conversation session, schedule a call, or send an email (S630). When the user does not want to schedule a conversation session, schedule a call, or send an email to an agent, the chat service module 148 transmits the user input to the automated chat bot 150 so the user can continue to chat with the automated chat bot (S614). When the user does want to schedule a conversation session, scheduler a call, or send an email to an agent, the chat service module 148 receives a chosen appointment time from the user or the scheduling module 156 transmits the email address of the agent to the user to allow the user to schedule a conversation session with the agent or to conduct the conversation through an email correspondence (S632). When the conversation session is complete, the feedback module 158 solicits feedback from the user and the agent (S634). Agent feedback is only solicited if an agent participated in the conversation session. The feedback module 158 receives feedback from the agent and/or the user (S636). The feedback module 158 adds the agent identification number and the received feedback to the historic chat database 144 (S638).

Figure 7:
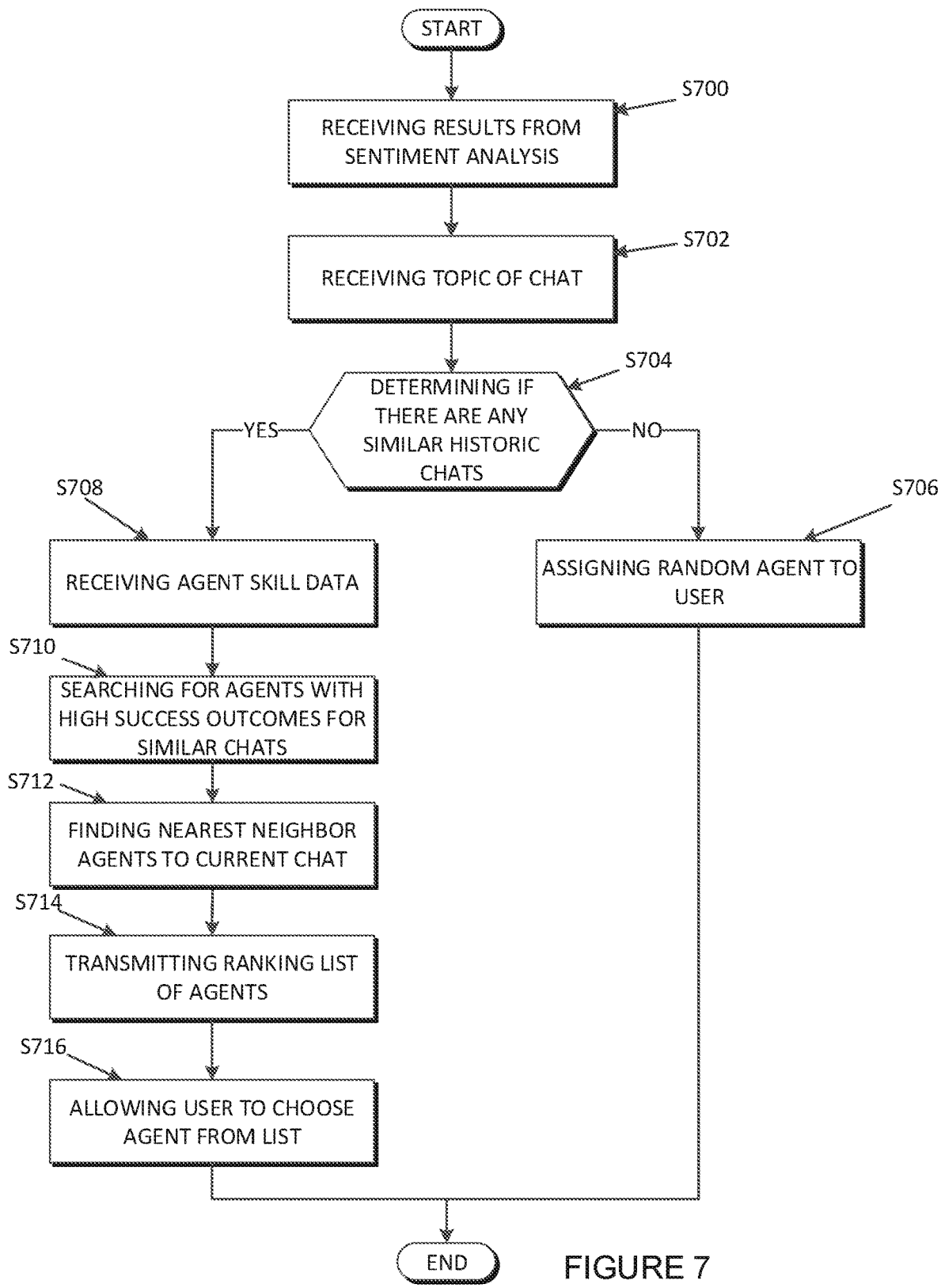
FIG. 7 is a flowchart depicting operational steps to select the suited agent for the user to be transferred to within the environment of FIG. 1, in accordance with an embodiment of the present invention.

FIG. 7 represents the agent selector module 154 determining the suited agent to take over the conversation session.

FIG. 7 illustrates the agent selector module 154 finding the suited agent from past chat transcripts in the historic chat database 144. The agent selector module 154 receives the sentiment analysis results from the sentiment analyzer module 152 (S700). The agent selector module 154 receives the topic of the conversation session from the chat service module 148 (S702). The agent selector module 154 determines if there are any similar historic chats by searching the historic chat database 144 for conversation sessions similar in topic (S704). When there are not any similar historic chats, the agent selector module 154 assigns a random agent to the user (S706). When there are similar historic chats, the agent selector module 154 receives agent skill data from the agent database 146 (S708). The agent selector module 154 searches the agent database 146 for agents with high success outcomes for similar conversation sessions (S710). The agent selector module 154 finds nearest neighbor historic chats, which are closest to the sentiment analysis results for the current conversation session (S712). The conversation sessions are grouped by agents, and the chat outcome ratings are aggregated for each agent, and potentially multiplied by a weighting factor proportional to the log of the number of aggregated chats, in order to determine the agents' ranking. The agent selector module 154 transmits a ranking list of agents to the scheduling module 156 (S714). The chat service module 148 allows the user to choose an agent from the list of available agents transmitted by the scheduling module 156 (S716).

Figure 8:
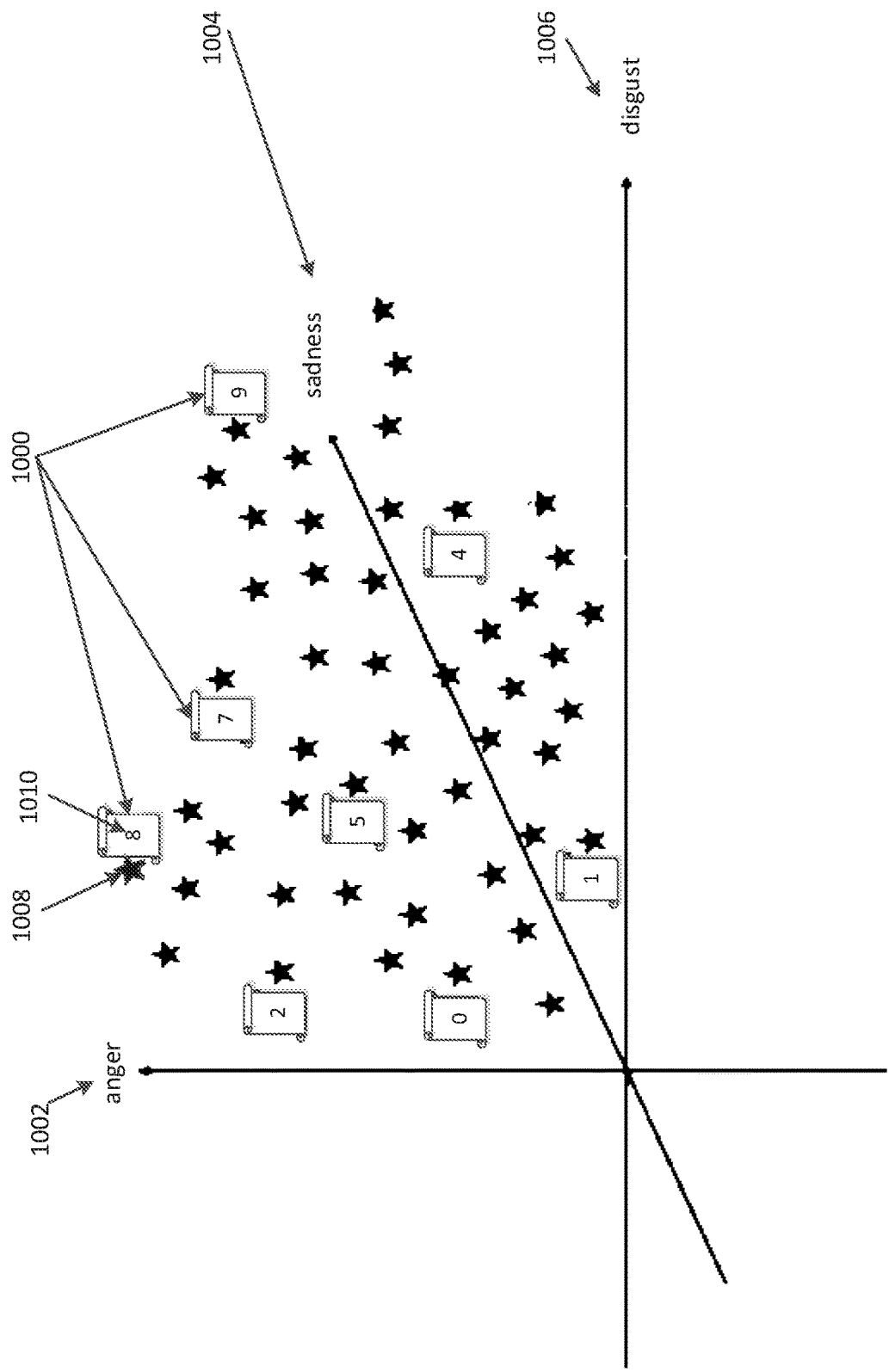
FIG. 8 illustrates an example of sentiment vector space used to determine if the sentiment analyzer crosses the transfer threshold, where the present invention can be implemented.

FIG. 8 represents an example of sentiment vector space in accordance with the most sophisticated method of determining whether the user should be transferred to an agent where the present invention is used.

FIG. 8 illustrates three-dimensional space where the axes represent sentiments. The sentiments in this example are anger 1002, sadness 1004, and disgust 1006. The stars 1008 represent sentiment vectors for similar historical user inputs created by the sentiment analyzer module 152. The scrolls 1000 indicate the switching score 1010 associated with the sentiment vector (star 1008) next to it. The switching score for a specific user input sentiment vector is found by averaging the switching scores of the nearest neighbor historic sentiment vectors. FIG. 5, FIG. 6A, and FIG. 6B illustrate the operational steps for preparation and execution of this method with regard to the sentiment vector space illustrated in FIG. 8.

Figure 9:
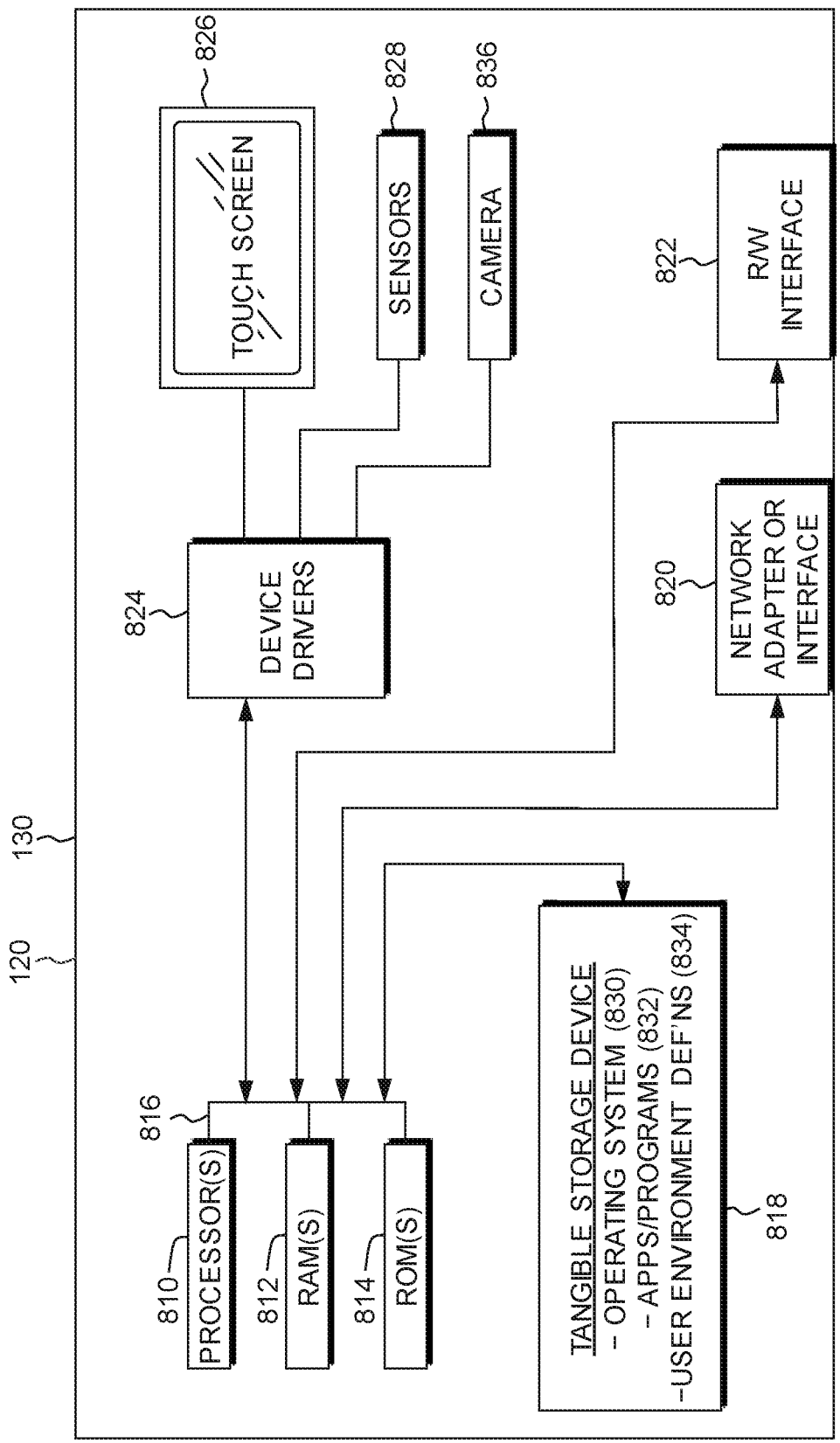
FIG. 9 is a block diagram of components of a mobile device of the system for the transfer of a user from an automated chat to an agent within the environment of FIG. 1, in accordance with embodiments of the present invention.

FIG. 9 is a block diagram of components of the user computing device 120 and/or the agent computing device 130 for invoking a user environment based on a device cover, in accordance with an embodiment of the present invention. In an exemplary embodiment, the user computing device 120 and/or the agent computing device 130 include one or more processors 810, one or more computer-readable RAMs 812, one or more computer-readable ROMs 814, and one or more computer-readable tangible storage devices 818 on one or more buses 816. One or more operating systems 830, one or more apps or programs 832, and one or more user environment definitions 834 are stored on the one or more computer-readable tangible storage devices 818 for execution by one or more of the processors 810 via one or more of the RAMs 812 (which typically include cache memory). In the illustrated embodiment, each of the computer-readable tangible storage devices 818 is a semiconductor storage device such as ROM 814, EPROM, flash memory or any other computer-readable tangible storage device that can store a computer program and digital information. Alternatively, each of the computer-readable tangible storage devices 818 is a magnetic disk storage device of an internal hard drive.

The user computing device 120 and/or the agent computing device 130 also includes a read/write (R/W) interface 822, for example, a USB port, to read from and write to external computing devices or one or more portable computer-readable tangible storage devices such as a CD-ROM, DVD, memory stick, magnetic disk, optical disk or semiconductor storage device. The apps and programs 832 and the user environment definitions 834 can be stored on the external computing devices or one or more of the portable computer-readable tangible storage devices, read via the R/W interface 822 and loaded onto the computer-readable tangible storage device 818.

The user computing device 120 and/or the agent computing device 130 also includes a network adapter or interface 820, such as a TCP/IP adapter card or wireless communication adapter (such as a 4G wireless communication adapter using OFDMA technology). The apps and programs 832 and the user environment definitions 834 can be downloaded to the user computing device 120 and/or the agent computing device 130 from an external computer or external storage device via a network (for example, the Internet, a local area network, a wide area network, or a wireless network) and network adapter or interface 820. From the network adapter or interface 820, the apps and programs 832 and the user environment definitions 834 are loaded into computer-readable tangible storage device 818. The network may comprise copper wires, optical fibers, wireless transmission, routers, firewalls, switches, gateway computers and/or edge servers.

The user computing device 120 and/or the agent computing device 130 also includes a touch screen 826, a camera 836, sensors 828, for example, touch screen sensors and magnetically sensitive circuits, and device drivers 824 to interface to touch screen 826 for imaging, to sensors 828 for pressure sensing of alphanumeric character entry and user selections and for detecting magnetic flux and polarity. The device drivers 824, R/W interface 822 and network adapter or interface 820 comprise hardware and software (stored in computer-readable tangible storage device 818 and/or ROM 814).

It should be appreciated that FIG. 9 provides only an illustration of one implementation and does not imply any limitations with regard to the environments in which different embodiments may be implemented. Many modifications to the depicted environment may be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for selecting a user environment based on a device cover. However, numerous modifications and substitutions can be made without deviating from the scope of the present invention. Therefore, the present invention has been disclosed by way of example and not limitation.

Figure 10:
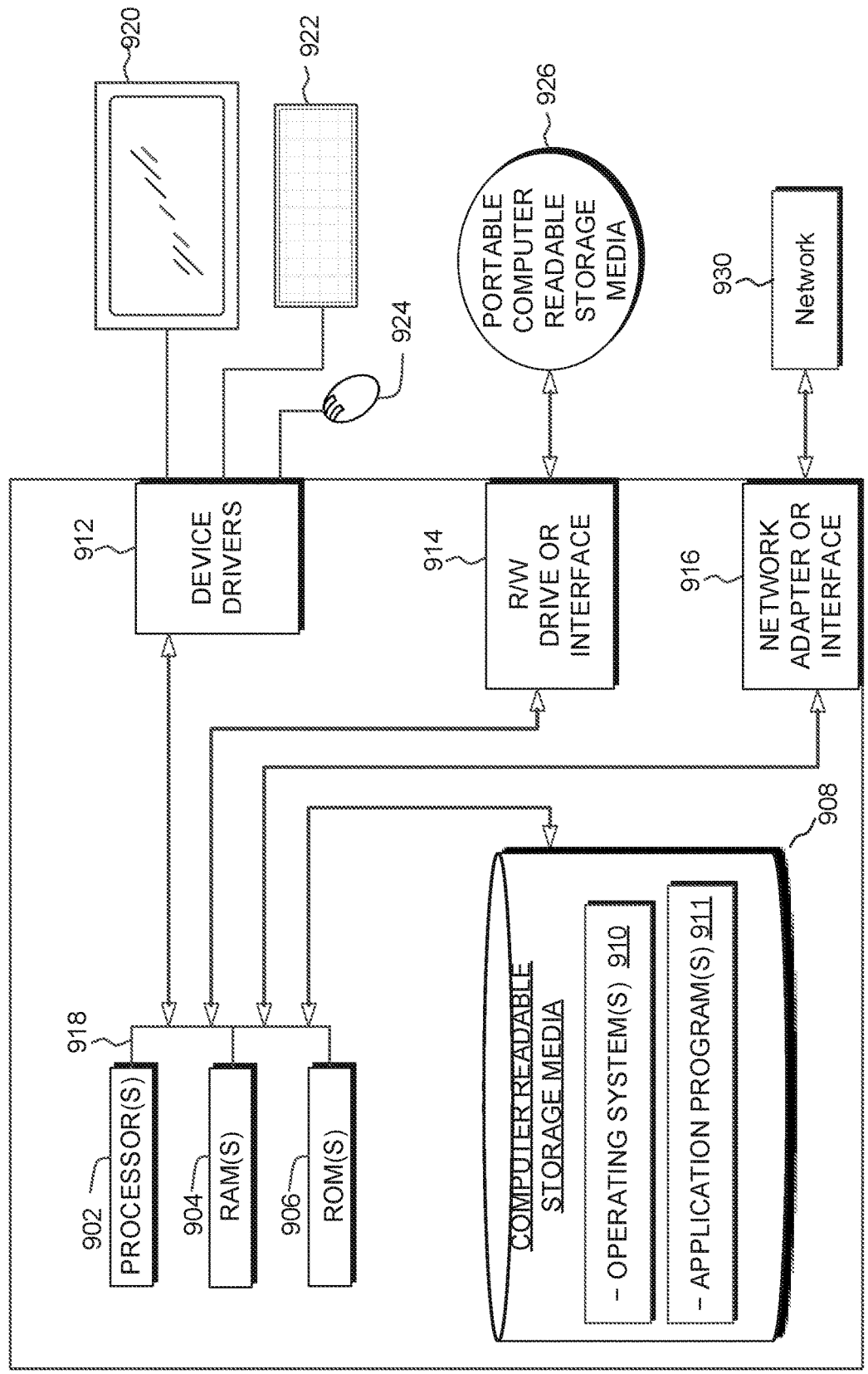
FIG. 10 is a block diagram of components of a computing device of the system for the transfer of a user from an automated chat to an agent within the environment of FIG. 1, in accordance with embodiments of the present invention.

FIG. 10 depicts a block diagram of components of the user computing device 120 and/or the agent computing device 130 of the system for determining a transfer to an agent and selecting the suited agent based on sentiments in an conversation session 100 of FIG. 1, in accordance with an embodiment of the present invention. It should be appreciated that FIG. 10 provides only an illustration of one implementation and does not imply any limitations with regard to the environments in which different embodiments may be implemented. Many modifications to the depicted environment may be made.

The user computing device 120 and/or the agent computing device 130 and/or the server 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the chat service module 148 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The user computing device 120 and/or the agent computing device 130 and/or the server 140 may also include a R/W drive or interface 914 to read from and write to one or more portable computer readable storage media 926. Application programs 911 on the user computing device 120 and/or the agent computing device 130 and/or the server 140 may be stored on one or more of the portable computer readable storage media 926, read via the respective R/W drive or interface 914 and loaded into the respective computer readable storage media 908.

The user computing device 120 and/or the agent computing device 130 and/or the server 140 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the user computing device 120 and/or the agent computing device 130 and/or the server 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The user computing device 120 and/or the agent computing device 130 and/or the server 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
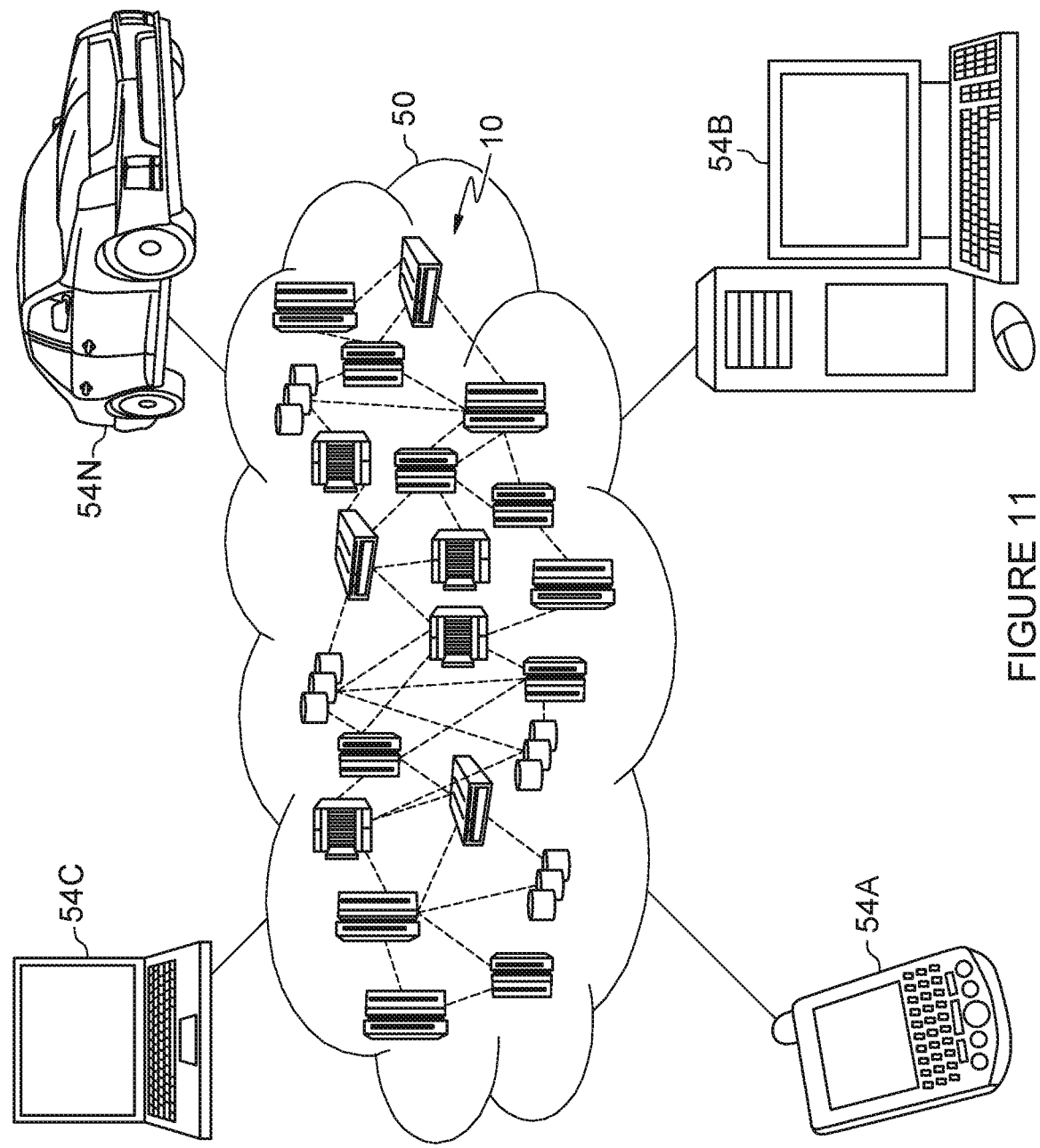
FIG. 11 depicts a cloud computing environment according to an embodiment of the present invention.
Figure 12:
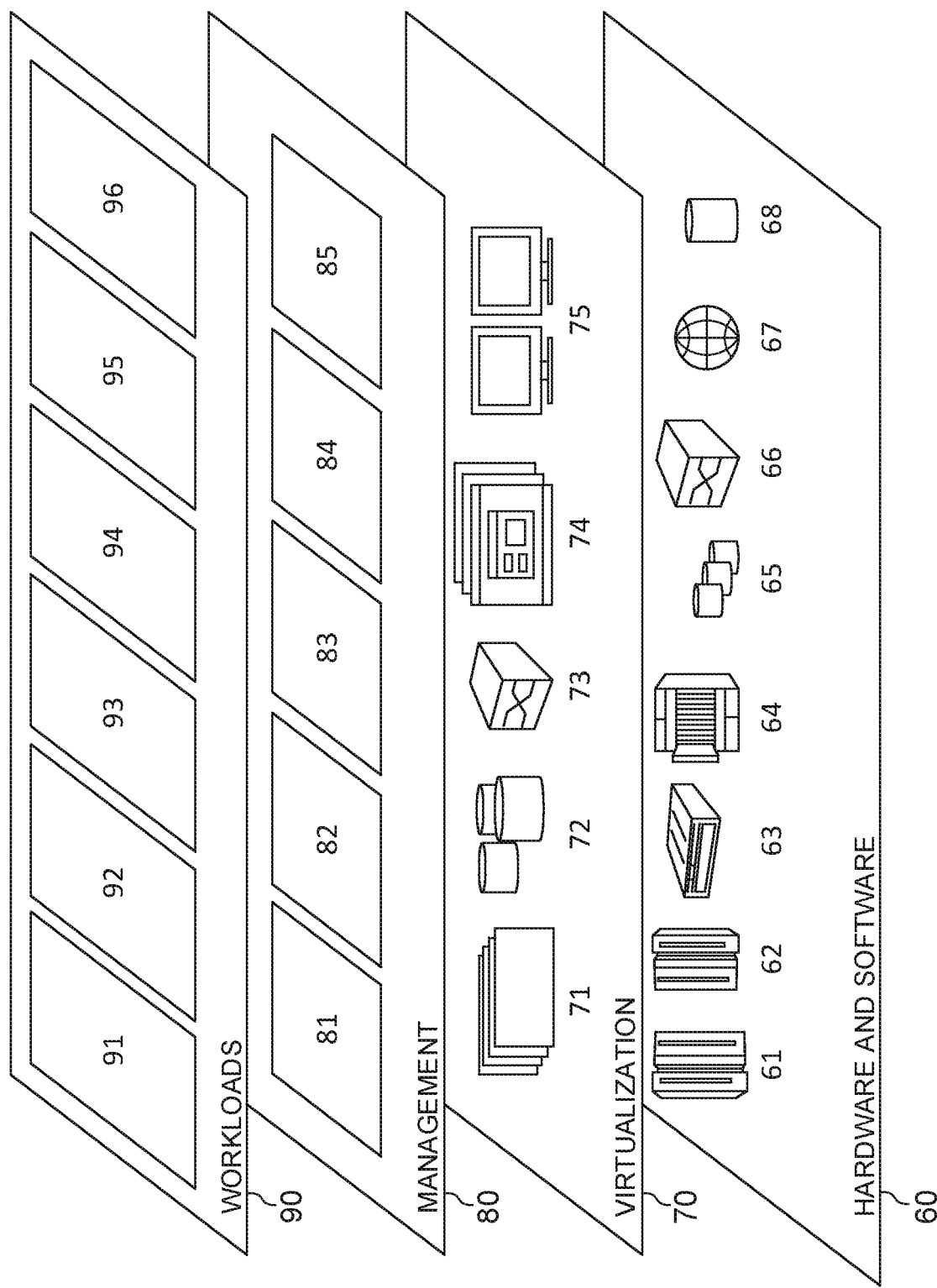
FIG. 12 depicts abstraction model layers according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chat service module 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A computer program product for an automated chat bot conversation session and an agent transfer system for the conversation session, the computer program product comprises:
    one or more non-transitory computer-readable storage media and program instructions stored on the one or more non-transitory computer-readable storage media, the program instructions comprise:
        receiving a user input from a user in an automated chat bot conversation session;
        analyzing the user input for at least one sentiment contained within the user input, wherein an at least one analysis result is a value assigned to the at least one sentiment;
        comparing the at least one analysis result to a threshold value to determine when to transfer the user from the automated chat bot conversation session to a conversation session with a suitable agent;
        increasing a counter by one for a plurality of sentiments that exceed the threshold value for the at least one sentiment;
        comparing the number on the counter to a cumulative threshold value; and
        in response to the number of the counter meeting or exceeding the cumulative threshold value, transferring the user to the conversation session with the suitable agent.

2. The non-transitory computer program product of claim 1, wherein an at least one analysis result is a value assigned to the at least one sentiment contained within the user input further comprises:
    assigning a band number for the at least one sentiment, wherein the band number comprises a range of values assigned to the at least one sentiment;
    assigning a switching score to the band number for the at least one sentiment;
    determining a sum of the switching scores by adding the switching score for each of the at least one sentiment in the user input; and
    transferring the user to the conversation session with the suitable agent when the sum of the switching score exceeds a switching score threshold that triggers the transfer to the conversation session with the suitable agent, wherein the threshold value is the switching score threshold.

3. The non-transitory computer program product of claim 1, further comprises:
    determining, by the computer, a chat topic for the conversation session;
    retrieving, by the computer, at least one similar historic chat transcripts from a database, wherein the similar historic transcripts is based on the at least one analysis result and the determined chat topic;
    creating a sentiment vector in sentiment vector space for the at least one sentiment contained within the user input;
    assigning a switching score to the sentiment vector for the at least one sentiment contained within the user input by averaging a switching score for a plurality of the nearest neighbor historic chat sentiment vectors in sentiment vector space; and
    determining whether the averaged switching score exceeds the threshold value that triggers the transfer to the conversation session with the suitable agent.

4. A computer system for an automated chat bot conversation session and an agent transfer system for the conversation session, the computer system comprises:
    one or more computer processors, one or more computer-readable storage media, and program instructions stored on one or more of the computer-readable storage media for execution by at least one of the one or more processors, the program instructions comprise:
        receiving a user input from a user in an automated chat bot conversation session;
        analyzing the user input for at least one sentiment contained within the user input, wherein an at least one analysis result is a value assigned to the at least one sentiment;
        comparing the at least one analysis result to a threshold value to determine when to transfer the user from the automated chat bot conversation session to a conversation session with a suitable agent;
        increasing a counter by one for a plurality of sentiments that exceed the threshold value for the at least one sentiment;
        comparing the number on the counter to a cumulative threshold value; and
        in response to the number of the counter meeting or exceeding the cumulative threshold value, transferring the user to the conversation session with the suitable agent.

5. The computer system of claim 4, further comprises:
    determining, by the computer, a chat topic for the conversation session;
    retrieving, by the computer, at least one similar historic chat transcripts from a database, wherein the similar historic transcripts is based on the at least one analysis result and the determined chat topic;
    creating a sentiment vector in sentiment vector space for the at least one sentiment contained within the user input;
    assigning a switching score to the sentiment vector for the at least one sentiment contained within the user input by averaging a switching score for a plurality of the nearest neighbor historic chat sentiment vectors in sentiment vector space; and determining whether the averaged switching score exceeds the threshold value that triggers the transfer to the conversation session with the suitable agent.

6. The computer system of claim 4, further comprises:
determining, by the computer, a sum of the switching scores by adding the switching score for each of the at least one sentiment in the user input; and
transferring, by the computer, the user to the conversation session with the suitable agent when the sum of the switching score exceeds a switching score threshold that triggers the transfer to the conversation session with the suitable agent, wherein the threshold value is the switching score threshold.

7. The computer system of claim 4, wherein the at least one analysis result further comprises:
assigning, by the computer, a band number for the at least one sentiment, wherein the band number comprises a range of values assigned to the at least one sentiment; and
assigning, by the computer, a switching score to the band number for the at least one sentiment.

8. The computer system of claim 4, wherein the receiving user input further comprises receiving a plurality of user inputs, and wherein analyzing, by the computer, the user input for at least one sentiment, further comprise analyzing the each of the plurality of user inputs for at least one sentiment, wherein an at least one analysis result is a value assigned to the at least one sentiment contained within each of the plurality of user inputs.

9. The computer system of claim 4, wherein analyzing the plurality of user inputs further comprises:
assigning, by the computer, a band number for each of the at least one sentiment in each of the plurality of user inputs, wherein the band number comprises a range of values assigned to the at least one sentiment;
assigning, by the computer, a switching score to the band number for each of the at least one sentiment in each of the plurality of user inputs;
determining, by the computer, a sum of the switching score by adding the switching score for each of the at least one sentiment in each of the plurality of user inputs; and
transferring, by the computer, the user to the conversation session with the suitable agent when the sum of the switching score from the plurality of user inputs exceeds the threshold value that triggers the transfer to the conversation session with the suitable agent.

10. The non-transitory computer program product of claim 1, further comprises:
determining, by the computer, a sum of the switching scores by adding the switching score for each of the at least one sentiment in the user input; and
transferring, by the computer, the user to the conversation session with the suitable agent when the sum of the switching score exceeds a switching score threshold that triggers the transfer to the conversation session with the suitable agent, wherein the threshold value is the switching score threshold.

11. The non-transitory computer program product of claim 1, further comprises:
determining, by the computer, a chat topic for the conversation session; and
retrieving, by the computer, at least one similar historic chat transcripts from a database, wherein the similar historic transcripts is based on the at least one analysis result and the determined chat topic.

12. The non-transitory computer program product of claim 11, wherein the analyzing, by the computer, the user input, further comprises:
creating, by the computer, a sentiment vector in sentiment vector space for the at least one sentiment contained within the user input;
assigning, by the computer, a switching score to the sentiment vector for the at least one sentiment contained within the user input by averaging a switching score for each of a plurality of the nearest neighbor historic chat sentiment vectors in sentiment vector space; and
determining, by the computer, whether the averaged switching score exceeds the threshold value that triggers the transfer to the conversation session with the suitable agent.

13. The non-transitory computer program product of claim 11, further comprises:
determining, by the computer, a plurality of suitable agents to respond to the user input, wherein each of the plurality of the suitable agents is skilled in the determined chat topic and has provided a positive outcome in a plurality of similar conversation sessions based on the retrieved historic chats; and
ranking, by the computer, the plurality of suitable agents based on provided a positive outcome in a plurality of similar conversations based on the retrieved historic chats.

14. The non-transitory computer program product of claim 13, further comprises:
determining, by the computer, availability of the plurality of suitable agents;
transmitting, by the computer, to the user the availability of the plurality of suitable agents and their ranking; and
receiving, by the computer, a user selection of the suitable agent from the transmitted availability of the plurality of suitable agents and their ranking;
wherein the user is transferred to the selected suitable agent.

15. The non-transitory computer program product of claim 1, further comprises:
determining, by the computer, whether the conversation session with the suitable agent is complete;
in response to determining that the conversation session is complete, soliciting, by the computer, a feedback from the user and the suitable agent that the user conducted the conversation session with;
receiving, by the computer, the feedback from the user and the suitable agent that the user conducted the conversation session with, wherein, the feedback reflects a plurality of opinions of the user and the suitable agent with regard to their satisfaction with the outcome of the conversation session; and
storing, by the computer, an identification number of the suitable agent, a conversation transcript based on the conversation between the user and the suitable agent, the user feedback, and the suitable agent feedback in the chat history database.

16. The non-transitory computer program product of claim 1, wherein the receiving user input further comprises receiving a plurality of user inputs, and wherein analyzing, by the computer, the user input for at least one sentiment, further comprise analyzing the each of the plurality of user inputs for at least one sentiment, wherein an at least one analysis result is a value assigned to the at least one sentiment contained within each of the plurality of user inputs.

17. The non-transitory computer program product of claim 1, wherein analyzing the plurality of user inputs further comprises:
   assigning, by the computer, a band number for each of the at least one sentiment in each of the plurality of user inputs, wherein the band number comprises a range of values assigned to the at least one sentiment;
   assigning, by the computer, a switching score to the band number for each of the at least one sentiment in each of the plurality of user inputs;
   determining, by the computer, a sum of the switching score by adding the switching score for each of the at least one sentiment in each of the plurality of user inputs; and
   transferring, by the computer, the user to the conversation session with the suitable agent when the sum of the switching score from the plurality of user inputs exceeds the threshold value that triggers the transfer to the conversation session with the suitable agent.

18. The non-transitory computer program product of claim 1, further comprises:
   determining, by the computer, a chat topic for the conversation session;
   retrieving, by the computer, at least one similar historic chat transcripts from a database, wherein the similar historic transcripts is based on the at least one analysis result and the determined chat topic;
   wherein analyzing the plurality of user inputs further comprises;
   creating, by the computer, a sentiment vector in sentiment vector space corresponding to each of the plurality of user inputs;
   assigning, by the computer, a switching score to the sentiment vector of each of the plurality of user inputs for the at least one sentiment contained within the user input by averaging a switching score for a plurality of the nearest neighbor historic chat sentiment vectors in sentiment vector space;
   determining, by the computer, a sum of the switching scores by adding the switching score for each of the sentiment vectors corresponding to the plurality of user inputs; and
   determining, by the computer, whether the sum of the averaged switching scores exceeds the threshold value that triggers the transfer to the conversation session with the suitable agent.

\* \* \* \* \*